(12) United States Patent
Tanabe et al.

(10) Patent No.: US 7,599,962 B2
(45) Date of Patent: Oct. 6, 2009

(54) CONTENT DELIVERY SYSTEM, CONTENT SERVER, CONTENT RECEIVER, CONTENT DELIVERY METHOD, STORAGE MEDIUM AND PROGRAM

(75) Inventors: Takumi Tanabe, Hyogo (JP); Kazuhide Sawabe, Osaka (JP)

(73) Assignee: Panasonic Corporation, Osaka (JP)

( * ) Notice: Subject to any disclaimer, the term of this patent is extended or adjusted under 35 U.S.C. 154(b) by 555 days.

(21) Appl. No.: 10/987,122

(22) Filed: Nov. 12, 2004

(65) Prior Publication Data

US 2005/0108287 A1    May 19, 2005

(30) Foreign Application Priority Data

Nov. 13, 2003    (JP)    ............................. 2003-384275

(51) Int. Cl.
*G06F 17/30*    (2006.01)
(52) U.S. Cl. .................................... 707/104.1; 707/100
(58) Field of Classification Search .................. 707/100, 707/102, 104.1
See application file for complete search history.

(56) References Cited

U.S. PATENT DOCUMENTS

| | | | | |
|---|---|---|---|---|
| 5,956,729 | A * | 9/1999 | Goetz et al. | 707/104.1 |
| 6,512,778 | B1 * | 1/2003 | Jones et al. | 370/465 |
| 6,950,941 | B1 * | 9/2005 | Lee et al. | 713/193 |
| 7,062,500 | B1 * | 6/2006 | Hall et al. | 707/102 |
| 2001/0013128 | A1 | 8/2001 | Hagai et al. | |
| 2001/0018772 | A1 * | 8/2001 | Shibata et al. | 725/93 |
| 2002/0059458 | A1 * | 5/2002 | Deshpande et al. | 709/246 |
| 2003/0033384 | A1 * | 2/2003 | Nishizawa et al. | 709/219 |
| 2003/0084460 | A1 * | 5/2003 | Chung et al. | 725/142 |
| 2003/0120602 | A1 * | 6/2003 | Jung et al. | 705/51 |
| 2007/0288961 | A1 * | 12/2007 | Guldi et al. | 725/46 |

FOREIGN PATENT DOCUMENTS

| | | |
|---|---|---|
| JP | 2001-101091 | 4/2001 |
| JP | 2001-242876 A | 9/2001 |

OTHER PUBLICATIONS

R. Fielding et al., Hypertext Transfer Protocol—HTTP/1.1, 1999, RFC 2616, The Internet Society, pp. 1, 8, 10, 18, 21-29, 35, 76, 85-86.*

(Continued)

*Primary Examiner*—Diane Mizrahi
(74) *Attorney, Agent, or Firm*—RatnerPrestia

(57) ABSTRACT

A content delivery system transmits content which is divided into a plurality of content blocks. The system includes a content server having a specifier to specify blocks associated with one or more ranges, and a transmitter to transmit the specified blocks according to a predetermined protocol. Each respective block has additional information attached indicating a common range for an attribute related to the content within the respective block. The system further includes a content receiver having a receiver to receive the content, a request range determiner to determine a request range of the content based on the attached additional information of each block by using block information indicating a length for each of the transmitted blocks, and a requestor to request the content associated with the determined request range from content associated with the one or more ranges.

27 Claims, 16 Drawing Sheets

OTHER PUBLICATIONS

L. Chiariglione, Short MPEG-1 description, MPEG 96/Jun. 1996, International Organization For Standardization, http://www.chiariglione.org/mpeg/standards/mpeg-1/mpeg-1/htm.*

Randall Stewart and Chris Metz, SCTP New Transport Protocol for TCP/IP, IEEE Internet Computing, Dec. 2001, pp. 64-69, vol. 5, Issue 6.*

IANA—Internet Assigned Numbers Authority, MIME media types web site, http://www.iana.org/assignments/media-types/, and http://web.archive.org/web/20020805230715/http://www.iana.org/assignments/media types/.*

E. Rescorla and A. Schiffman, The Secure HyperText Transfer Protocol, Aug. 1999, RFC 2660, http://www.faqs.org/ftp/rfc/pdf/rfc2660.txt.pdf.*

Stream Control Transmission Protocol, R. Stewart et al., RFC 2960, Oct. 2000, http://www.rfc-editor.org/rfc/rfc2960.txt.*

RFC2616 (http://www.ring.gr.jp/pub/doc/RFC/rfc2616.txt), p. 122-124, 14.16 Content-Range, p. 138-140, 14.35 Range.

DTCP/IP (http://www.dtcp.com/data/info_20031124_dtco_VISE_1p0.pdf) p. 14 VISE. 4.20.

* cited by examiner

Fig.1(a)

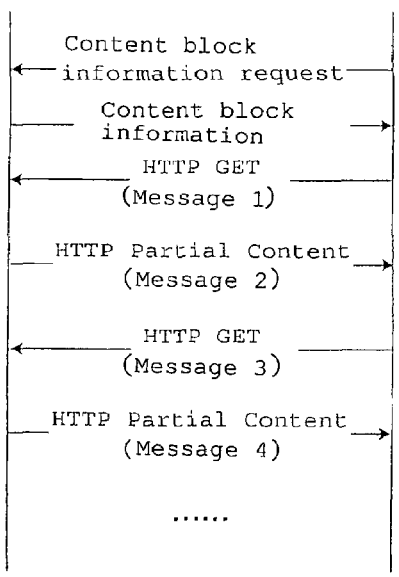

Fig.1(b) Message 1

```
GET /hoge.exe HTTP/1.1
Accept */*
Host: server
Range: bytes=0-6539
Connection: Keep-Alive
```

Fig.1(c) Message 2

```
HTTP/1.1 206 Partial Content
Content-Range: bytes 0-6539/*
Content-Length: 6540
Content-Type: application/octet-stream <message body>
```

Fig.1(d) Message 3

```
GET /hoge.exe HTTP/1.1
Accept */*
Host: server
Range: bytes=6540-12679
Connection: Keep-Alive
```

Fig.1(e) Message 4

```
HTTP/1.1 206 Partial Content
Content-Range: bytes 6540-12679/*
Content-Length: 6140
Content-Type: application/octet-stream <message body>
```

Fig.1(f)

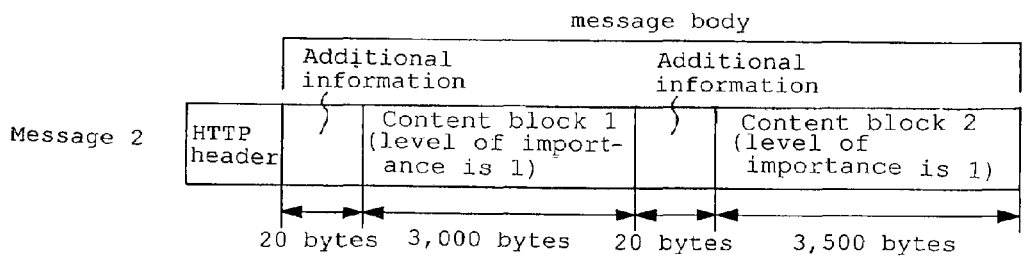

Fig.1(g)

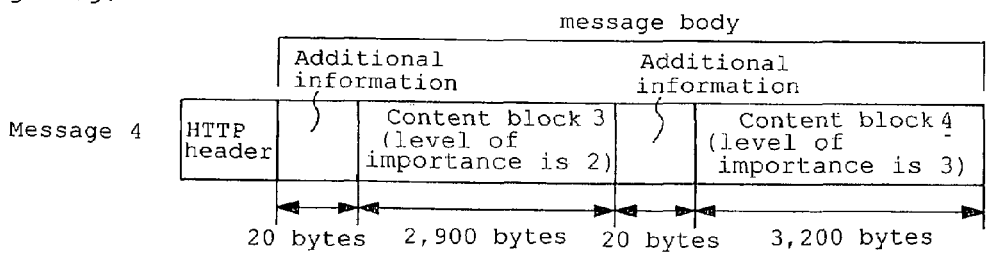

Fig.12(a)

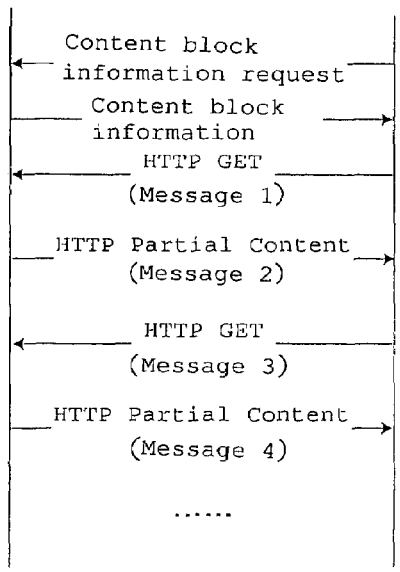

Fig.12(b) Message 1

```
GET /hogehoge.mpg HTTP/1.1
Accept video/*
Host: server
Range: bytes=0-2200039
Connection: Keep-Alive
```

Fig.12(c) Message 2

```
HTTP/1.1 206 Partial Content
Content-Range: bytes 0-2200039/*
Content-Length: 2200040
Content-Type: video/mpeg <message body>
```

Fig.12(d) Message 3

```
GET /hogehoge.mpg HTTP/1.1
Accept video/*
Host: server
Range: bytes=2200040-4200079
Connection: Keep-Alive
```

Fig.12(e) Message 4

```
HTTP/1.1 206 Partial Content
Content-Range: bytes 2200040-4200079/*
Content-Length: 2000040
Content-Type: video/mpeg <message body>
```

Fig.12(f)

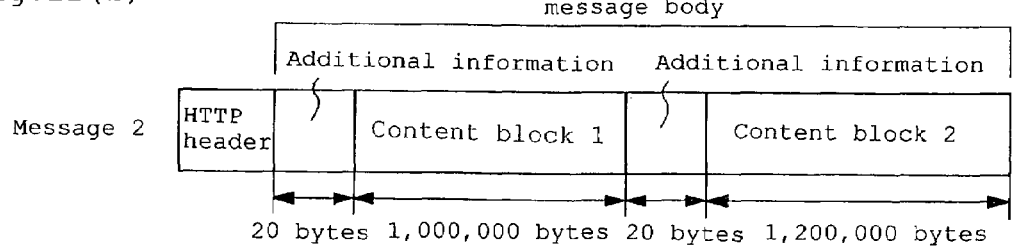

Fig.12(g)

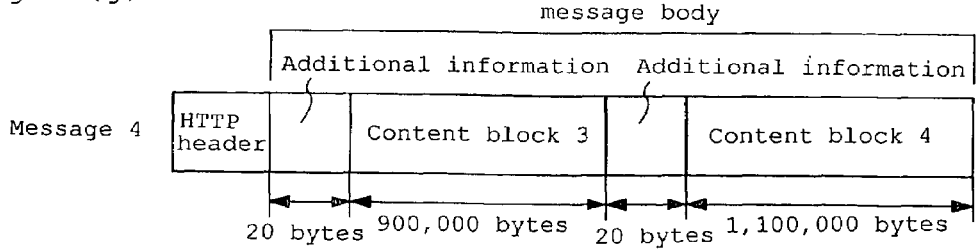

CONTENT DELIVERY SYSTEM, CONTENT SERVER, CONTENT RECEIVER, CONTENT DELIVERY METHOD, STORAGE MEDIUM AND PROGRAM

BACKGROUND OF THE INVENTION

1. Field of the Invention

The present invention relates to a content delivery system, a content server, a content receiver, a content delivery method, a storage medium, and a program, for delivering a content to which additional information is attached based on an attribute of the content.

2. Related Art of the Invention

In general, when a content receiver attempts to receive a content stored in a content server through a network, the receiver sends a request to the content server by using a communication protocol such as HTTP and the like to receive content data (for example, see [Hypertext Transfer Protocol—HTTP/1.1] RFC2616 by R. Fielding et al as a document 1).

However, when the request is sent only by designating the content, the whole content is sent from the content server to the content receiver in response to a single request and when a receiving buffer for handling the communication protocol is limited in the content receiver, it is not possible to receive only a portion of the content. Further, even when the content receiver has some portions of the content, the content has to be received from beginning to end.

To improve these issues, some communication protocols support a block transfer so as to allow some portions of the content to be received. For example, HTTP provides for the block transfer by, a Range header included in a HTTP request message (for example, see Japanese Patent Laid-Open No. 2001-101091 as a document 2). The entire disclosures of the above described documents are incorporated herein by references in their entireties.

When the content is AV content, and the content receiver attempts to playback the AV content including image, video and audio stored in the content server, similarly as described above, the content server and receiver can send and receive the AV content. Particularly in the case of the AV content, an AV content player sends a request, while checking the availability of the receiving buffer prior to sending the AV content to the decoder. In this case, the sending and receiving of the AV content data is performed by using the above described block transfer.

However, when the content is transferred from the content server, additional information is sometimes attached according to a fixed rule based on an attribute of each portion of the content. As the additional information, for example, there are information regarding a level of importance of the portion, information regarding an encryption, and the like. In the case of the additional information regarding a level of importance, an intermediate device and the like between the content server and the content receiver monitor the additional information, and transfer the content data in the order of importance in case a network load is high. An example of information regarding an encryption is information regarding an encryption key.

The additional information is given every time the corresponding attribute within the content may be changed. For example, in the case of the additional information regarding the level of importance, the additional information is attached again every time the level of importance is changed within the content. For every transfer unit (packet and message) of the communication protocol, the additional information is always attached to the end of the communication protocol header. This is because of dealing with the situation or the like where the preceding packet or message is lost on the network.

FIGS. 2(a) to 2(c) show the examples of a HTTP message where additional information is given to a content and further it is transferred by HTTP. In FIG. 2(a), while the content is divided into three blocks according to the level of importance, the content is transmitted by two HTTP messages. In the first HTTP message shown in FIG. 2(b), right after the HTTP header, there follow additional information for a content block 1, the content block 1, additional information for a content block 2, and a portion (first half) of the content block 2. In the second HTTP message shown in FIG. 2(c), right after the HTTP header, first, there follows on the additional information for the content block 2. This is according to the rule that the additional information is always attached to the end of the HTTP header. Subsequently, there follow a portion (last half) of the content block 2, the additional information for a content block 3, and the content block 3.

FIGS. 3(b) to 3(d) are examples, where the transmission is made by three HTTP messages similarly to the case where the content of FIG. 3(a) is the same as shown in FIG. 2(a). Three content blocks are transmitted by three HTTP messages, respectively. In the first HTTP message shown in FIG. 3(b) right after the HTTP header, there follow the additional information for the content block 1 and the content block 1. In the second HTTP message shown in FIG. 3(c), right after the HTTP header, there follow the additional information for the content block 2 and the content block 2. In the third HTTP message shown in FIG. 3(d), right after the HTTP header, there follow the additional information for the content block 3 and the content block 3.

The data transferred as a message body (data portion) of each HTTP messages is data including the additional information followed by the content data. In terms of the HTTP protocol, since there is no differentiation between the additional information and the content data, both the additional information and the content data are transferred as a message body, and a data length (value of the Content-Length header) included in the HTTP header is also a sum of the additional information and the content data.

When the content receiver attempts to acquire a portion of the content included in the content server, for example, by using the Range header of HTTP, there arises a problem when such an additional information exists. The data sent and received by the HTTP is data including several additional information. Consequently, when the content receiver attempts to acquire a portion of the content, a range to be acquired has to be designated by supposing a whole data consisting of additional information and content data.

However, as evident from the FIGS. 2(b) and 2(c) and FIGS. 3(b) to 3(d), the number of additional information sent and received in total is being changed depending on how to divide the content. Since the content receiver has no idea where the attribute changes in the content, the receiver does not know where the additional information is inserted, and consequently, the receiver is unable to designate the range to be acquired.

That is, there is a problem that a conventional content receiver is unable to designate a range desired to be received when the content attached with the additional information is received from the content server.

Further, when the content is AV content, particularly information regarding a copyright management is sometimes attached as the additional information. That is, information to the effect that some portions of the AV content are allowed to be copied, but some other portions are not allowed to be copied. In this case, the portions that are not allowed to be copied must be transferred after enciphered on the network. Further, in case the encryption key is renewed periodically, information regarding decryption may be attached as the additional information.

When the content is AV content, the content receiver, while checking the availability of the receiving buffer, transmits such a request as attempting to acquire a portion of the AV content. In this case, when the additional information and the like regarding the copyright management is attached in the midst of the content, the content receiver must designate the range to be acquired by supposing the whole data consisting of additional information and AV content data. However, since the content receiver has no idea where the information and the like regarding the copyright management changes in the AV content, the receiver does note know a range of the playbacking to be requested.

That is, there is a problem that the conventional content receiver does not know a range to be requested when the AV content attached with the additional information is received from the content server.

In consideration of the above described problems, an object of the present invention is to provide a content delivery system, a content server, a content receiver, a content delivery method, a storage medium, and a program, which can designate a range desired to be received when the content receiver tries to receive a content with the additional information.

SUMMARY OF THE INVENTION

The $1^{st}$ aspect of the present invention is a content delivery system for transmitting a content which is divided into a plurality of content blocks so that attribute of the content does not change within said one content block, comprising:
- a content server having specifying means of specifying said content block of a requested request range, and transmitting means of transmitting said specified content block according to a predetermined communication protocol by attaching an additional information according to an attribute of said content for said every content block; and
- a content receiver having receiving means of receiving said content, request range determining means of determining a request range of said content on condition that the additional information according to the attribute of said content is attached for every said content block by utilizing the content block information including at least length of said all content blocks, and requesting means of requesting for said content of the determined request range;
- wherein said specifying means specifies said content block of said request range requested by said requesting means, and
- wherein said receiving means receives said content transmitted from said transmitting means.

Hence, the content delivery system can be constructed which is capable of definitely designating a range desirable to be received by the content receiver to the content server when sending and receiving the content with the additional information.

The $2^{nd}$ aspect of the present invention is a content server for transmitting a content which is divided into a plurality of said content blocks so that attribute of the content does not change within one content block, comprising:
- specifying means of specifying said content block of a requested request range, and transmitting means of transmitting said specified content block according to a predetermined communication protocol by attaching an additional information according to attribute of said content for every content block,
- wherein said specifying means specifies said content block of the said request range requested by requesting means of the content receiver comprising: receiving means of receiving said content; request range determining means of determining a request range of said content on condition that the additional information is attached according to attribute of said content for every said content block by utilizing the content block information including at least length of said all content blocks; and requesting means of requesting for said content of the determined request range, and
- said content transmitted from said transmitting means is received by said receiving means.

Hence, the content server can definitely designate a range of the content requested by the content receiver.

The $3^{rd}$ aspect of the present invention is the content server according to the $2^{nd}$ aspect of the present invention, wherein said predetermined communication protocol is HTTP (Hypertext Transfer Protocol).

Hence, the previous invention can be realized by a standard protocol.

The $4^{th}$ aspect of the present invention is the content server according to the $3^{rd}$ aspect of the present invention, wherein said additional information is attached to the head of said content block, and said transmitting means transmits said content block so that a data portion of the HTTP message starts from the additional information.

Hence, even when the HTTP message is lost, the attribute of the content block in the next HTTP message can be known.

The $5^{th}$ aspect of the present invention is the content server according to the $2^{nd}$ aspect of the present invention, wherein said content block has a fixed length.

Hence, the processing specifying the range to be requested is simplified.

The $6^{th}$ aspect of the present invention is the content server according to the $2^{nd}$ aspect of the present invention, wherein said transmitting means transmits said content block information, and said requesting means uses the transmitted content block information.

Hence, the newest content block information can be always provided for the content receiver.

The $7^{th}$ aspect of the present invention is the content server according to the $2^{nd}$ aspect of the present invention, wherein said content is an AV content including image, video and/or audio.

Hence, the previous invention can be realized also by the transmission of the AV content. Particularly, the network playbacking of the AV content with the additional information can be effectively provided.

The $8^{th}$ aspect of the present invention is the content server according to the $2^{nd}$ aspect of the present invention, wherein said additional information includes information showing a state of the copyright protection of said content.

Hence, the previous invention can be applied to the content having a state of copyright protection as the attribute.

The $9^{th}$ aspect of the present invention is the content server according to the $2^{nd}$ aspect of the present invention, wherein, when said transmitted content is enciphered, said additional information includes information for deciphering said transmitted content.

Hence, the previous invention can be applied also when the content is enciphered at the time of transmitting.

The $10^{th}$ aspect of the present invention is the content server according to the $7^{th}$ aspect of the present invention, wherein said AV content is a video of a MPEG format, and said content block is GOP (Group of Picture).

Hence, the previous invention can be applied to video complying with MPEG format.

The 11$^{th}$ aspect of the present invention is the content server according to the 7$^{th}$ aspect of the present invention, wherein said AV content is video of DVD-VR format, and said content block is VOBU (Video Object Unit).

Hence, the previous invention can be applied to video complying with DVD-VR format.

The 12$^{th}$ aspect of the present invention is a content receiver for transmitting a content which is divided into a plurality of said content blocks so that attribute of the content does not change within one content block, comprising:

a receiving means of receiving said content transmitted from transmitting means of the content server having specifying means of specifying said content block of the requested request range and transmitting means of transmitting said specified content block according to a predetermined communication protocol by attaching the additional information according to attribute of said content for every said content blocks;

request range determining means of determining the request range of said content on condition that the additional information according to attribute of said content for every said content block is attached by utilizing the content block information including at least length of said all content blocks; and requesting means of requesting for said content of the determined request range, wherein said specifying means specifies said content block of said request range requested by said requesting means.

Hence, the content receiver can designate a range of the content to be requested even when it does not know where the attribute of the content changes.

The 13th aspect of the present invention is the content receiver according to the 12$^{th}$ aspect of the present invention, wherein said predetermined communication protocol is HTTP (Hypertext Transfer Protocol).

Hence, the previous invention can be realized by a standard communication protocol.

The 14$^{th}$ aspect of the present invention is the content receiver according to the 13$^{th}$ aspect of the present invention, wherein said additional information is attached to the head of said content block, and said transmitting means transmits said content block so that a data portion of the HTTP message starts from the additional information.

Hence, even when the HTTP message is lost, the attribute of the content block in the next HTTP message can be known.

The 15$^{th}$ aspect of the present invention is the content receiver according to the 12$^{th}$ aspect of the present invention, wherein said content block has a fixed length.

Hence, the content receiver generates and acquires the content block information by itself without acquiring the content block information through the network.

The 16$^{th}$ aspect of the present invention is the content receiver according to the 12$^{th}$ aspect of the present invention, wherein said transmitting means transmits said content block information, and said requesting means uses the transmitted content block information.

Hence, the content receiver can always utilize the newest content block information.

The 17$^{th}$ aspect of the present invention is the content receiver according to the 12$^{th}$ aspect of the present invention, wherein said content is an AV content including image, video and/or audio.

Hence, the previous invention can be realized also by the transmission of the AV content. Particularly, the network playbacking of the AV content accompanied with the additional information can be effectively provided.

The 18$^{th}$ aspect of the present invention is the content receiver according to the 12$^{th}$ aspect of the present invention, wherein said additional information includes information showing a state of the copyright protection of said content.

Hence, the previous invention can be applied also to the content having a state of copyright protection as the attribute.

The 19$^{th}$ aspect of the present invention is the content receiver according to the 12$^{th}$ aspect of the present invention, wherein, when said transmitted content is enciphered, said additional information includes information for deciphering said transmitted content.

Hence, the previous invention can be applied also when the content is enciphered at the time of transmitting.

The 20$^{th}$ aspect of the present invention is the content receiver according to the 17$^{th}$ aspect of the present invention, wherein said AV content is video of a MPEG format, and said content block is GOP (Group of Picture).

Hence, the previous invention can be applied also to the video complying with MPEG format.

The 21$^{st}$ aspect of the present invention is the content receiver according to the 17$^{th}$ aspect of the present invention, wherein said AV content is video of a DVD-VR format, and said content block is VOBU.

Hence, the previous invention can be applied to the video complying with DVD-VR format.

The 22$^{nd}$ aspect of the present invention is a content delivery method used for the content delivery system comprising a content server and a content receiver, the content delivery system transmitting a content which is divided into a plurality of content blocks so that attribute of the content does not change within one content block, wherein said content server performs a specifying step for specifying said content block of a requested request range and a transmitting step for transmitting said specified content block according to a predetermined communication protocol by attaching additional information according to attribute of said content for every said content block, wherein said content receiver performs a receiving step for receiving said content, and a request range determining step for determining the request range of said content on condition that the additional information according to attribute of said content is attached for said every content block by utilizing the content block information including at least length of said all content blocks, and a requesting step for requesting said content of the determined request range, wherein said specifying step specifies said content block of said request range requested by said requesting step, and wherein said receiving step receives said content transmitted from said transmitting step.

Hence, the content delivery method can be provided, which can definitely designate the range desired to be received by the content receiver to the content server at the time of sending and receiving the content with the additional information.

The 23$^{rd}$ aspect of the present invention is a content delivery method for transmitting a content which is divided into a plurality of said content blocks so that attribute of the content does not change within one content block, said content delivery method comprising: specifying step for specifying said content block of are quested request range; and transmitting step for transmitting said specified content block according to a predetermined communication protocol by attaching the additional information according to attribute of said content for every content block, wherein said specifying step specifies said content block of said request range requested by requesting means of the content receiver comprising: receiving means of receiving said content; request range determining means of determining a request range of said content on condition that the additional information according to attribute of said content is attached for every said content block by utilizing the content block information including at least length of said all content blocks; and said requesting means of requesting for said content of the determined request range, and wherein said content transmitted from said transmitting step is received by said receiving means.

Hence, the content delivery method can be provided, which can definitely designate the range desired to be received by the content receiver to the content server at the time of transmitting the content with the additional information.

The 24$^{th}$ aspect of the present invention is a content delivery method for receiving a content which is divided into a plurality of content blocks so that attribute of the content does not change within one content block, said content delivery method comprising: a receiving step for receiving said content transmitted from transmitting means of the content server having specifying means of specifying said content block of a requested request range and said transmitting means of transmitting said specified content block according to a predetermined communication protocol by attaching the additional information according to attribute of said content for every content block;

a request range determining step for determining the request range of said content on condition that the additional information according to attribute of said content is attached for every said content block by utilizing the content block information including at least length of said all content blocks; and a requesting step for requesting said content of the determined request range, wherein said specifying means specifies said content block of said request range requested by said requesting step.

Hence, the content delivery method can be provided, which can definitely designate the range desired to be received by the content receiver to the content server at the time of receiving the content with the additional information.

The 25$^{th}$ aspect of the present invention is a program for allowing a computer to function as means of the content delivery system according to the 1$^{st}$ aspect of the present invention, the means comprising:

specifying means of specifying said content block of the requested request range; transmitting means of transmitting said specified content block according to a predetermined communication protocol by attaching the additional information according to attribute of said content for said every content block of the content server;

receiving means of receiving said content; request range determining means of determining the request range of said content on condition that the additional information according to distribute of said content for said every content block by utilizing the content block information including at least length of said all content blocks; and requesting means of requesting for said content of the determined request range of the content receiver.

Hence, a program can be provided, which realizes the content delivery system of the first aspect of the invention by a computer.

The 26$^{th}$ aspect of the present invention is a program for allowing a computer to function as means of the content server according to the 2$^{nd}$ aspect of the present invention, the means comprising:

specifying means of specifying said content block of the requested request range; and transmitting means of transmitting said specified content block according to a predetermined communication protocol by attaching the additional information according to attribute of said content for said every content block.

Hence, a program can be provided, which realizes the content server of the second aspect of the invention by a computer.

The 27$^{th}$ aspect of the present invention is a program for allowing a computer to function as means of the content receiver according to the 12$^{th}$ aspect of the present invention, the means of comprising:

receiving means of receiving said content transmitted from said transmitting means of the content server having specifying means of specifying said content block of the requested request range, and transmitting means of transmitting said specified content block according to a predetermined communication protocol by attaching the additional information according to attribute of said content for said every content block, request range determining means of determining the request range of said content on condition that the additional information according to attribute of said content for said every content block is attached for said every content block by utilizing the content block information including at least length of said all content blocks, and requesting means of requesting for said content of the determined request range.

Hence, a program can be provided, which realizes the content receiver of the twelfth aspect of the invention by a computer.

The 28$^{th}$ aspect of the present invention is a storage medium storing a program according to any one of the 25$^{th}$ to the 27$^{th}$ aspects of the present invention, said storage medium being processable by a computer.

Hence, a storage medium can be provided, which processes any program of the twenty-fifth to twenty-seventh aspects of the invention by a computer.

The present invention can provide a content delivery system, a content server, a content receiver, a content delivery method, a storage medium, and a program, which can designate a range desired to be received when the content receiver tries to receive a content with additional information is received from the content server.

BRIEF DESCRIPTION OF THE DRAWINGS

FIG. 1(a) is a sequence diagram describing a sending and receiving between a content server and a content receiver in a first embodiment of the present invention;

FIG. 1(b) is a view for explaining what is described in the message 1 transmitted to the content server from the content receiver in the first embodiment of the present invention;

FIG. 1(c) is a view for explaining what is described in the message 2 transmitted to the content receiver from the content server in the first embodiment of the present invention;

FIG. 1(d) is a view for explaining what is described in the message 3 transmitted to the content server from the content receiver in the first embodiment of the present invention;

FIG. 1(e) is a view for explaining what is described in the message 4 transmitted to the content receiver from the content server in the first embodiment of the present invention;

FIG. 1(f) is a view showing the configuration of the message 2;

FIG. 1(g) is a view showing the configuration of the message 4;

FIG. 12(a) is a sequence view describing a transmission between an AV server and an AV content player in the second embodiment of the present invention;

FIG. 12(b) is a view for explaining what is described in the message 1 to be transmitted to the AV server from the AV content player in the second embodiment of the present invention;

FIG. 12(c) is a view for explaining what is described in the message 2 to be transmitted to the AV content player from the AV server in the second embodiment of the present invention;

FIG. 12(d) is a view for explaining what is described in the message 3 to be transmitted to the AV server from the AV content player in the second embodiment of the present invention;

FIG. 12(e) is a view for explaining what is described in the message 4 to be transmitted to the AV content player from the AV server in the second embodiment of the present invention;

FIG. 12(f) is a view showing the configuration of the message 2;

FIG. 12(g) is a view showing the configuration of the message 4;

DESCRIPTION OF SYMBOLS

Figure 2A:
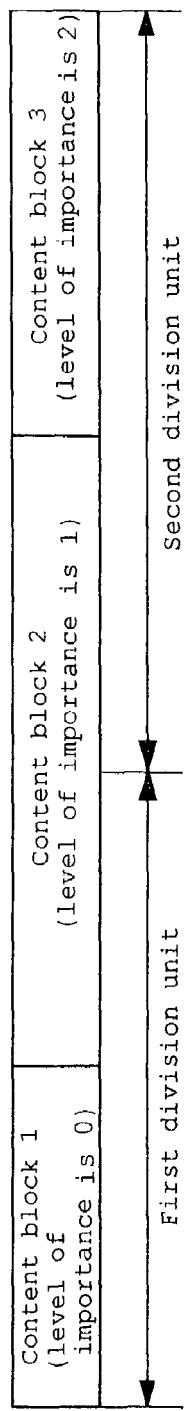
FIG. 2(a) is a view showing a configuration of a content, content blocks and division units in the prior art.
Figure 2B:
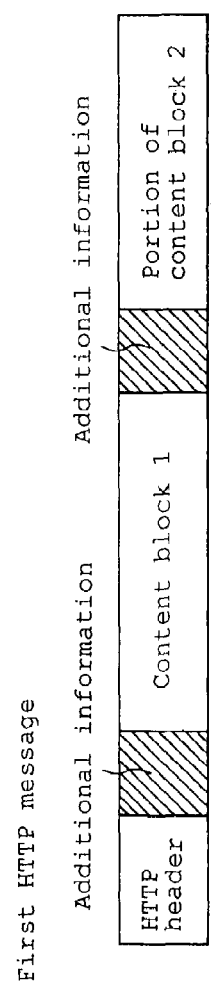
FIG. 2(b) is a view showing a configuration of the first HTTP message in the prior art.
Figure 2C:
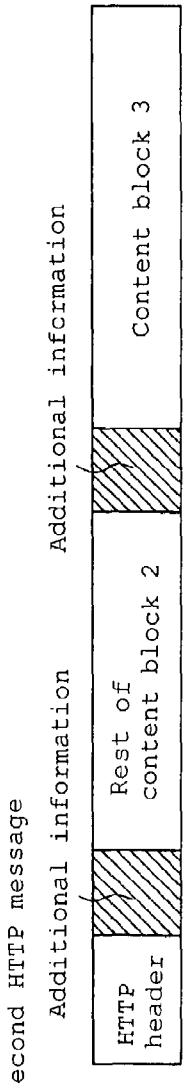
FIG. 2(c) is a view showing a configuration of the second HTTP message in the prior art.
Figure 3A:
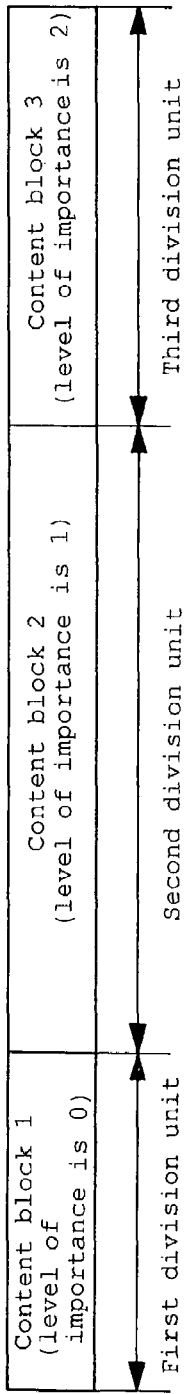
FIG. 3(a) is a view showing another configuration of the content, the content block and the division unit in the prior art.
Figure 3B:
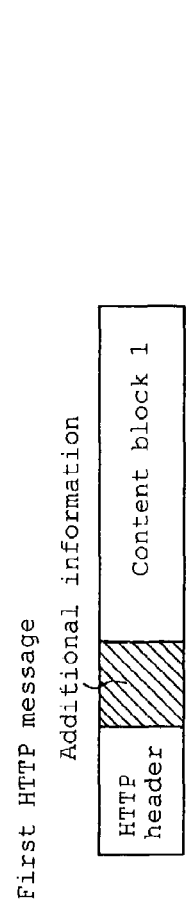
FIG. 3(b) is a view showing another example of the configuration of the first HTTP message in the prior art.
Figure 3C:
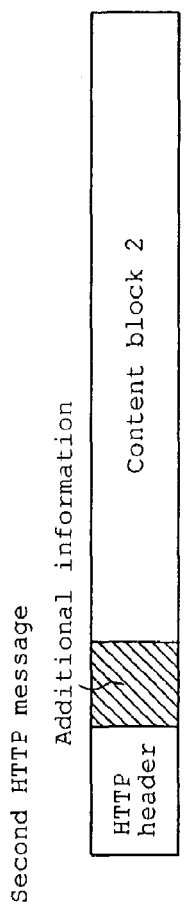
FIG. 3(c) is a view showing another example of the configuration of the second HTTP message in the prior art.
Figure 3D:
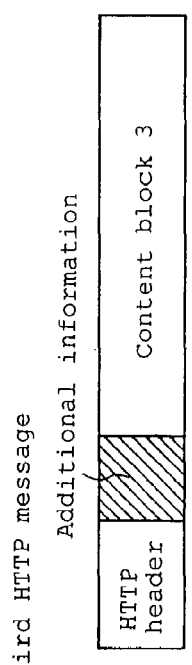
FIG. 3(d) is a view showing another example of the configuration of the third HTTP message in the prior art.

1 Content server
101 Storage means
102 Data request receiving means
103 Content data acquiring means
104 Transmission content data constructing means
105 Transmitting means
106 Content block information holding and transmitting means
2 Content receiver
201 User inputting means
202 Request range determining means
203 Data request transmitting means
204 Receiving means
205 Receiving buffer
206 Content processing means
207 Content block information acquiring means
3 Network
13 AV server
1301 Playbacking request receiving means
1302 AV content data acquiring means
1303 Enciphering means
1304 Encryption key generating means
1305 Transmission AV content data constructing means
14 AV content playbacking means
1401 Playbacking request transmitting means
1402 Playbacking means
1403 Deciphering means
1404 Deciphering key generating means

DETAILED DESCRIPTION OF THE PREFERRED EMBODIMENTS

Embodiments of the present invention will be described below with reference to the drawings.

First Embodiment

A first embodiment of the present invention will be described below with reference to the drawings.

Figure 4:
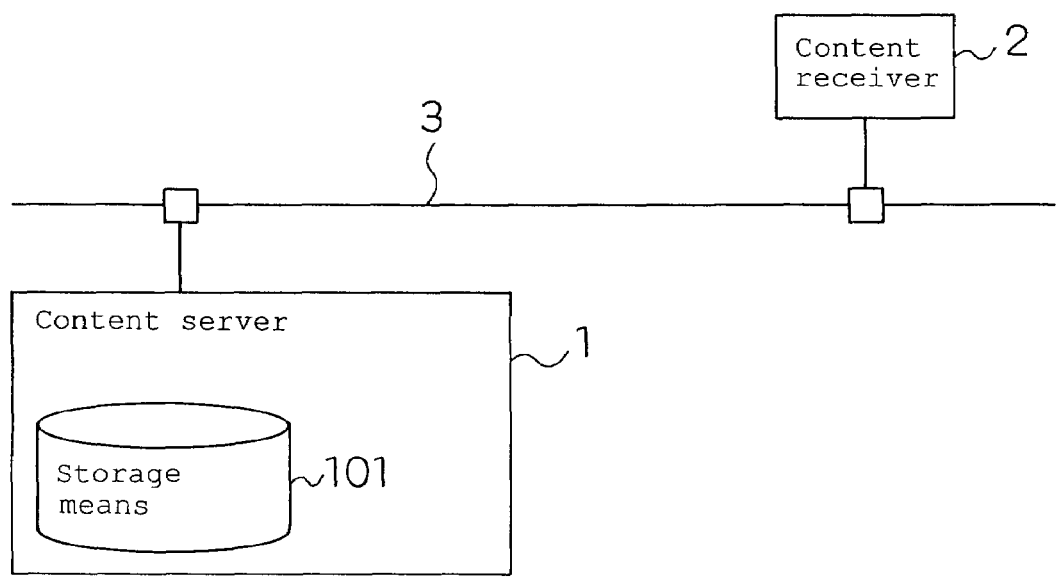
FIG. 4 is a view showing the configuration of a network adapted for the first embodiment of the present invention.

FIG. 4 is a block diagram of a network adapted to the present embodiment. A content server 1 transmits a content stored in a storage means 101 to the network 3 based on a request from a content receiver 2. The content receiver 2 receives the content from the content server 1, and performs a processing according to the substance of the content. As an example of the content, a text, an image, a video, an audio, an executable file, and the like can be cited.

FIG. 1(a) is a sequence view describing a transmission between the content server 1 and the content receiver 2. In the present embodiment, HTTP protocol is used for this transmission. However, there is no objection raised regarding a transmission protocol in the present invention. FIG. 1(a) is an example, where the content receiver 2 dividedly receives a program hoge.exe as one example of the content stored in the storage means 101 of the content server 1 from the beginning of the content.

Figures 5, 6:
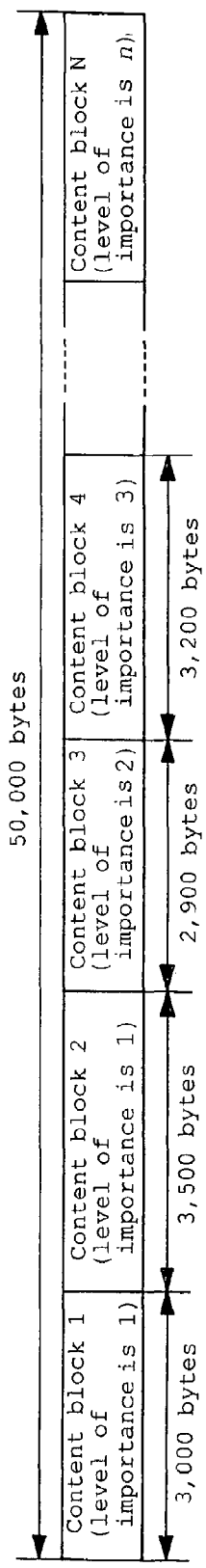
FIG. 5 is a view showing the configuration of a program hoge.exe cited as an example of the content in FIG. 1 in the first embodiment of the present invention.
FIG. 6 is a view showing an attribute table corresponding to the program hoge.exe cited as an example of the content in FIG. 1 in the first embodiment of the present invention.

In FIG. 5 is illustrated a configuration of the hoge.exe. The hoge.exe has a total size of 50,000 bytes, and consists of several content blocks. Although it has a level of importance as the attribute, there is no change in the level of the importance within one content block. That is, the content is divided into a plurality of content blocks so that the attribute of the content does not change within each content block. The first content block has 3,000 bytes, the second content block has 3,500 bytes, the third content block has 2,900 bytes, and the fourth content block has 3,200 bytes. From among these contents, the first 6,500 bytes have a level of importance 1, the next 2,900 bytes have a level of importance 2, and the next 3,200 bytes have a level of importance 3.

A level of importance is an example of the attributes. It may be another attribute, and the entire content may have the same attribute. Further, there is no object raised on the total size nor on the block size. Although the storage means 101 is preferably a non-volatile storage medium such as a hard disc, it can be realized also by a volatile storage medium.

In FIG. 1(a), the content server 1 and the content receiver 2, first, exchange content block information regarding a content desired to be transferred. The content block information is a table showing how the content blocks are divided within the substance of the content. In FIG. 6 is shown an example of the content block information. An offset shows byte length of the content from the beginning. From this table, it is clear that a content block 1 starts from the 0th byte to the 2,999th byte, a content block 2 from the 3,000th byte to the 6,499th byte, a content block 3 from the 6,500th byte to the 9,399th byte, and a content block 4 from the 9,400th byte to the 12,599th byte. For the exchange of the content block information, HTTP may be used or another communication protocol may be used.

The content block information is acquired by the content receiver 2, then the content receiver 2 transmits a message 1 which is a data request toward the content server 1 on condition that additional information is attached to the heads of all the content blocks. As shown in FIG. 1(b), the message 1 includes a Range header as a request range, and requests for the transmission from the 0th byte to the 6,539th byte. This takes into consideration, as shown in FIG. 1(f), the fact that, in a message 2 intended to be transmitted according to the request, there are the content block 1 and the content block 2, and moreover, 20 byte of additional information is added to each of these content blocks. This additional information is information showing a level of importance as the attribute.

Upon receiving the message 1, the content server 1 transmits the message 2. The message 2, as shown in FIG. 1 (c), includes a Content-Range header, and shows that the transmission of the 0th byte to the 6,539th byte is performed. Here, the range of transmission of the content data excluding the additional information is from the 0th byte to the 6,499th byte. By adding two additional information to this range, the transmission becomes from 0th byte to the 6,539th byte. The content receiver 2, after executing a predetermined processing to the received message 2, retrieves the 0th byte to the 6,539th byte, and processes the content.

The same thing holds true with the message 3 and the message 4 (shown by FIGS. 1(d), 1(e) or 1(g), respectively). Subsequently, the above described procedure is repeated until the end of the content is transmitted or the content reception is stopped by the user of the content receiver 2.

That is, the content is divided into a plurality of content blocks so that the attribute of the content does not change within each content block. The content server 1, when sending the portion of the content requested by the receiver 2 to the content receiver 2, attaches the additional information according to the attribute of the content to each content block, and transmits the content. Consequently, the receiver 2 can designate a range desired to be received when receiving the content with the additional information from the content server based on the content block information on condition that the additional information is attached to each content block and transmitted. Thus, as shown in the message 2 of FIG. 1(f), even in the case where the content block 1 and the content block 2 are transmitted by one HTTP message and also in the case where the content block 1 and the content block 2 are divided by two HTTP messages and transmitted, the additional information is attached to the content block 1 by one piece only, and is attached also to the content block 2 for one piece only. In this way, regardless of how the HTTP message is prepared by the combination or division of the content block, since the additional information is always attached to every content block, the content receiver 2, when receiving the content attached with the additional information from the content server, can designate a range desired to be received.

Further, the content server 1, when preparing the HTTP message such as the message 2 and the like, prepares the HTTP message in such a way that the additional information always comes right after the HTTP header similarly to the message 2 of FIG. 1(f), so that the server 1 can easily cope with a situation in which a packet or a message just before the header is lost on the network. That is, the content server 1 attaches the additional information to the head of the content block, and transmits the HTTP message such that the message body of the HTTP message is started from the additional information, thereby the server 1 can easily cope with a situation in which the packet or the message right before the content block is missed on the network.

In case the size of the content block is, for example, a fixed length of 2 K bytes or the like, the additional information is attached to the head of the content block, and one or more content blocks are stored in a message body portion of the HTTP message, so that the head of the message body of the HTTP message can easily be allowed to start from the additional information.

Figure 7:
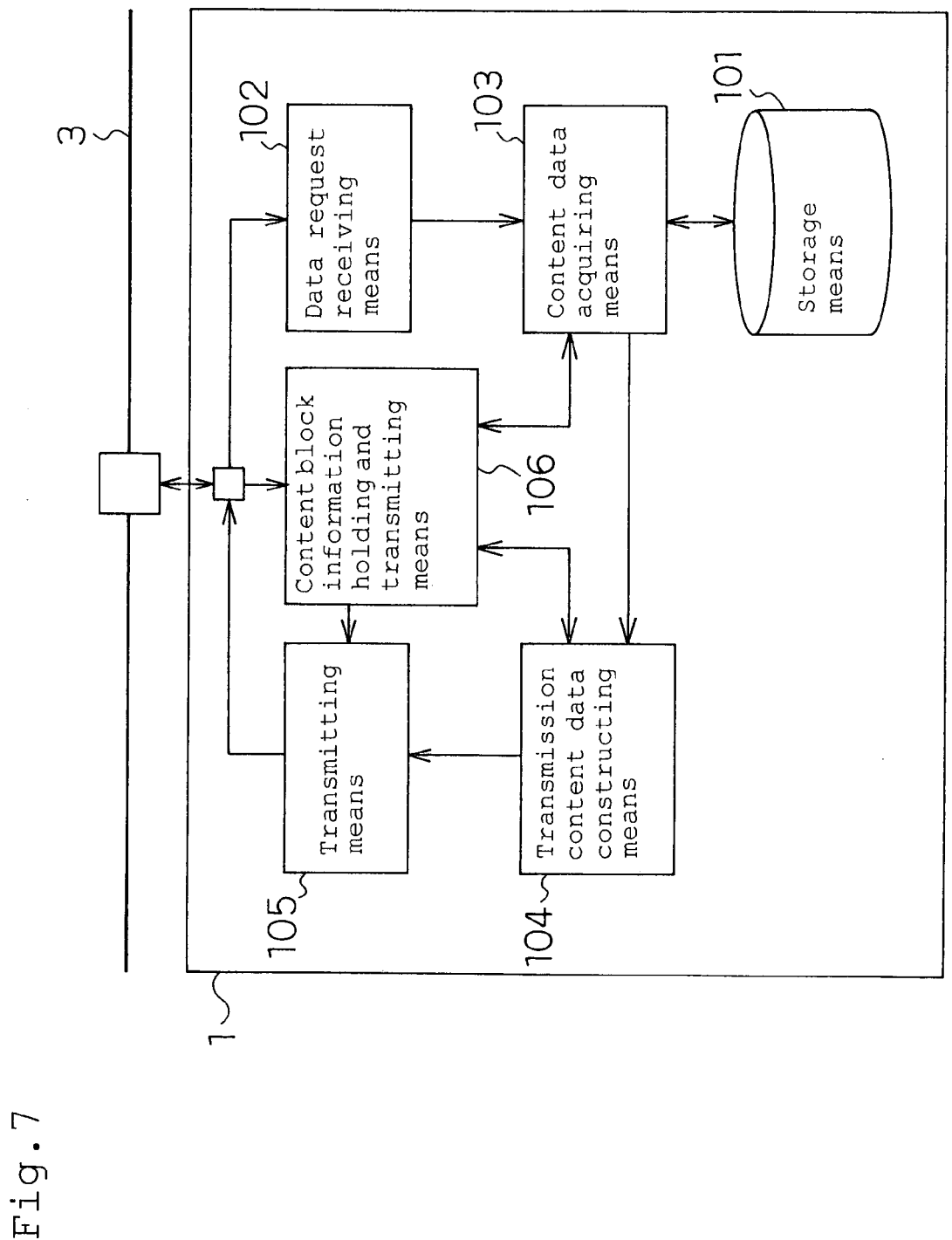
FIG. 7 is a block diagram showing the configuration of the content server in the first embodiment of the present invention.

FIG. 7 is a block diagram showing a configuration of the content server 1 of the present embodiment. In FIG. 7, the storage means 101 includes with one or more contents. Data request receiving means 102 receives a data request from the content receiver 2 through the network 3. The data request comprises a content identifier, which is information for identifying the content, and a request range of the content identified by the content identifier. Here, the request range is a range calculated by including the additional information also on condition that the additional information is attached for every content block.

Content data acquiring means 103 refers to a content block holding and transmitting means 106 in order to know which portion of the content is requested by the received request range after excluding the additional information and determines which portion of the content from the received request range should be transmitted. The content data acquiring means 103, when sending the retrieved content data to transmission content data constructing means 104, sends the content blocks one by one. That is, the content data acquiring means 103, after sending one content block to the transmission content data constructing means 104, notifies the transmission content data constructing means 104 of completion of sending of the content block.

The transmission content data constructing means 104 attaches the additional information necessary for sending the content data to the content data of the range transmitted from the content data acquiring means 103, and constructs the transmission content data.

Transmitting means 105 transmits the transmission content data transmitted from the transmission content data constructing means 104 and the content block information from the content block information holding and transmitting means 106 to the content receiver 2 through the network 3 according to HTTP.

The content block information holding and transmitting means 106 holds the content block information for every content. Further, the content block information holding and transmitting means 106 receives the content block information request from the content receiver 2 and transmits the corresponding content block information through the transmitting means 105.

Figure 8:
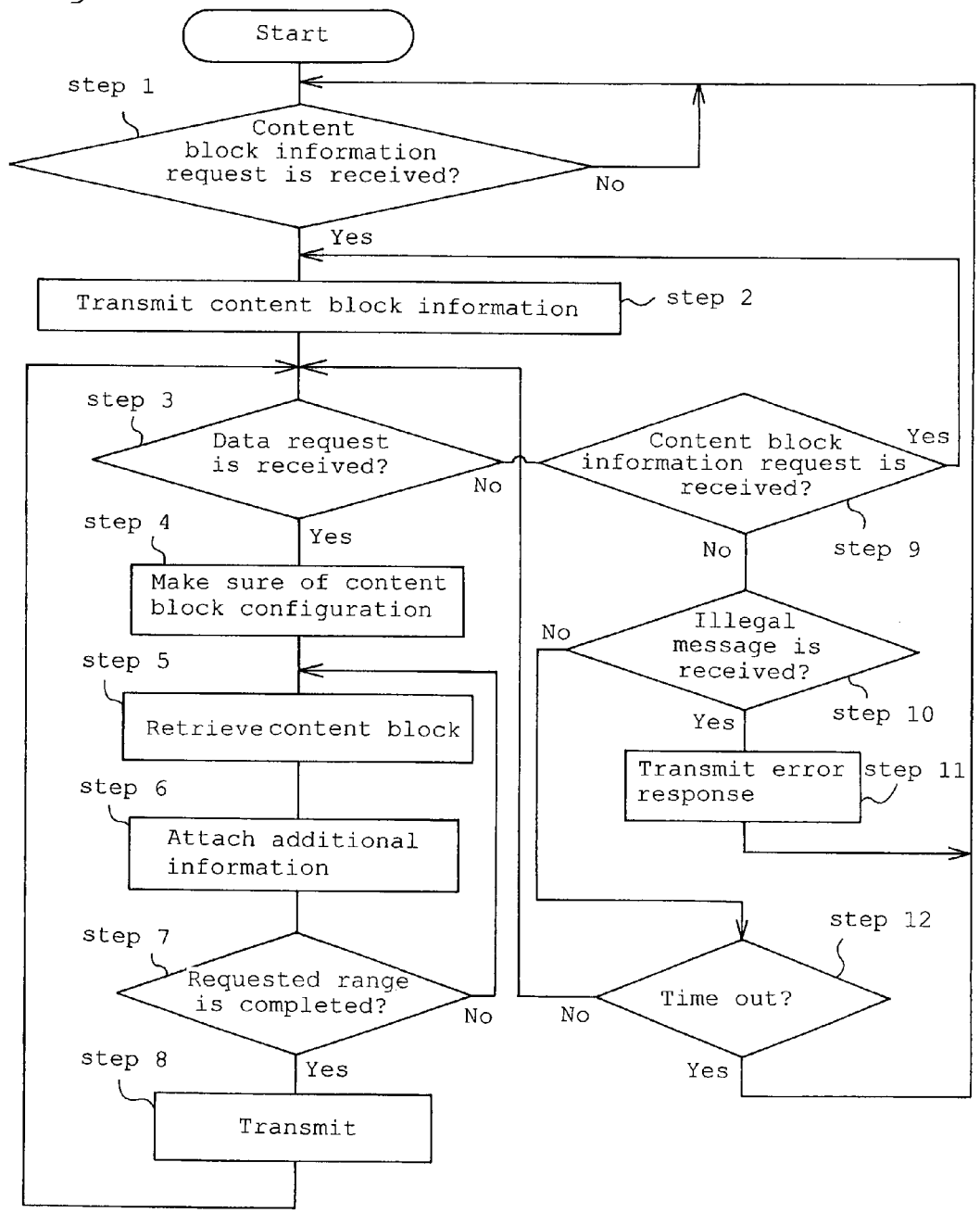
FIG. 8 is a flowchart showing the behavior of the content server in the first embodiment of the present invention.

FIG. 8 is a flowchart showing the behavior of the content server 1 of the present embodiment. Hereinafter, the behavior of the content server 1 in the sequence described with reference to FIGS. 1(*a*) to 1(*g*) will be described by using FIG. 8, and at the same time, through this description, one embodiment of the content delivery method of the present invention will be described.

Upon receipt of a content block information request including the content identifier of the content desired to be acquired from the content receiver 2 by the content server 1 (step 1), the content block information holding and transmitting means 106 transmits the content block information corresponding to the content identifier to the content receiver 2 through the transmitting means 105 (step 2).

Subsequently, when the data request receiving means 102 receives the HTTP message which is a data request (the messages 1 and 3 of FIG. 1(*b*) and (*d*) including a GET method) (step 3), this HTTP message is sent to the content data acquiring means 103.

The content data acquiring means 103 extracts a URI (hoge.exe in the present embodiment), which is the content identifier, from the received HTTP message, and extracts the request range from the Range header. The content data acquiring means 103 first refers to the content block information holding and transmitting means 106, and makes sure of the content block information of the content shown by the content identifier (step 4). The content data acquiring means 103 specifies a position of actual content data from the received request range on condition that all the content blocks of the content are attached with the additional information and that one content block is attached with one piece only of the additional information. Next, the content data acquiring means 103 retrieves the first content block equivalent to the request range from the storage means 101 (step 5), and transmits it to the transmission content data constructing means 104, and when the transmission of the content block up to the end is completed, notifies the transmission content data constructing means 104.

The transmission content data constructing means 104 attaches the additional information to the head of the content block sent from the content data acquiring means 103 (step 6). In the present embodiment, the information regarding what type of the additional information (information showing a level of importance in the present embodiment) should be given to the content block is recorded in the head of the content block.

The transmission content data constructing means 104, when having attached the additional information to one content block, notifies the content data acquiring means 103 to that effect. The content data acquiring means 103, when there is a content block corresponding to the request range which is not yet transmitted, transmits the next content block to the transmission content data constructing means 104, and notifies the means 104 to that effect when the transmission is completed.

When the data to be transmitted reaches the end of the data range requested (step 7), the content data acquiring means 103 notifies the transmission content data constructing means 104 of the completion of the transmission of the entire range, and the transmission content data constructing means 104 transmits the content blocks and one or more attached additional information constructed so far to the transmitting means 105 as a transmission content data.

The transmitting means 105 transmits the transmitted transmission content data in conformity to HTTP (step 8). At this time, the Content-Range header of the HTTP message is written with a data range when the additional information is attached. After the transmission, the procedure returns to step 3.

At step 3, when the content receiver 2 receives a new content block information request during the data request is not being received (step 9), the procedure returns to step 2 and transmits the corresponding content block information. When an illegal message is received (step 10), an error response is transmitted (step 11), and the procedure returns to step 1. When a predetermined time passes before the data request and the content block information are not yet received (step 12), the procedure returns to step 1.

Figure 9:
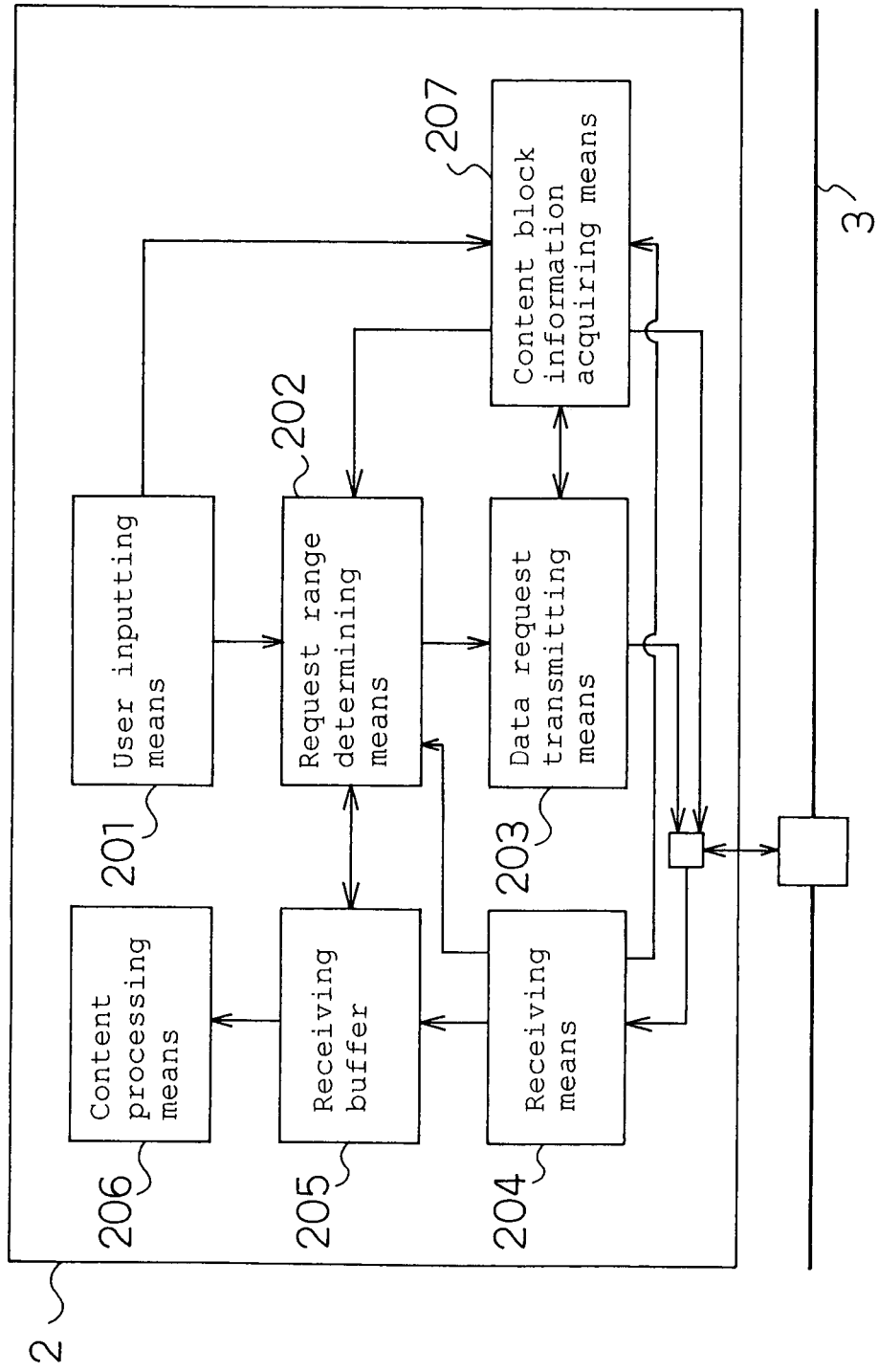
FIG. 9 is a block diagram showing the configuration of a content receiver in the first embodiment of the present invention.

FIG. 9 is a block diagram showing the configuration of the content receiver 2 of the present embodiment. In FIG. 9, user input means 201 receives a content identifier (such as a name of a content) from the user. The identifier is information for identifying a content to perform a content reception by the user. To be more specific, the user inputting means 201 receives the content identifier and a range (starting at 1 Mbyte point and the like) of the data desired to be acquired. The user inputting means 201 may receive only the content identifier. The input means of the information received by the user inputting means 201 may be anything such as operating a menu screen by using a ten key, a key board, a mouse, and a remote controller. The user inputting means 201 can be realized by a device driver of the input means such as the ten key, the key board and the like and a control software of the menu screen and the like.

Request range determining means 202 determines a request range upon receipt of the notification from the user inputting means 201, an enquiry result regarding the available capacity of the receiving buffer 205, the notification from receiving means 204, and the other information or notification. The request range is determined as the range in which the additional information corresponding to the range of the data to be acquired is included on condition that a range of the data to be acquired is determined based on the information received by the user inputting means 201, the enquiry result regarding the available capacity of the receiving buffer 205, the notification from the receiving means 204 and the like, and that the additional information is attached to the heads of all the content blocks configuring the content by referring to content block information acquiring means 207.

Data request transmitting means 203 generates a data request including the content identifier and a request range which request for reception, and transmits it to the network 3.

The receiving means 204 receives the content data with the additional information from the network 3, and transmits the content data to the receiving buffer 205 and, at the same time, notifies the request range determining means 202 a length of the received content data or the end position of the received data. The receiving means 204 analyzes the additional information before or after the content data is transmitted to the receiving buffer 205, and performs an appropriate processing if required. For example, when it is known from the additional information that the content data is enciphered, a deciphering processing is performed.

Content processing means 206 reads the content data in order from the receiving buffer 205 and performs necessary processing. For example, it performs a display on the screen and a predetermined calculation. The content processing means 206 may be considered as including or not including an output device such as display, a speaker and the like. The content processing means 206 can be realized by the driver software and the processing software of the output device or by the driver software of the output device, the output device and the processing software or an application program on a MPU and the like.

The content block information acquiring means 207 transmits a content block information request for requesting for the content block information, and receives the content block information from the content server 1 as its response through the receiving means 204, and holds it.

Figure 10:
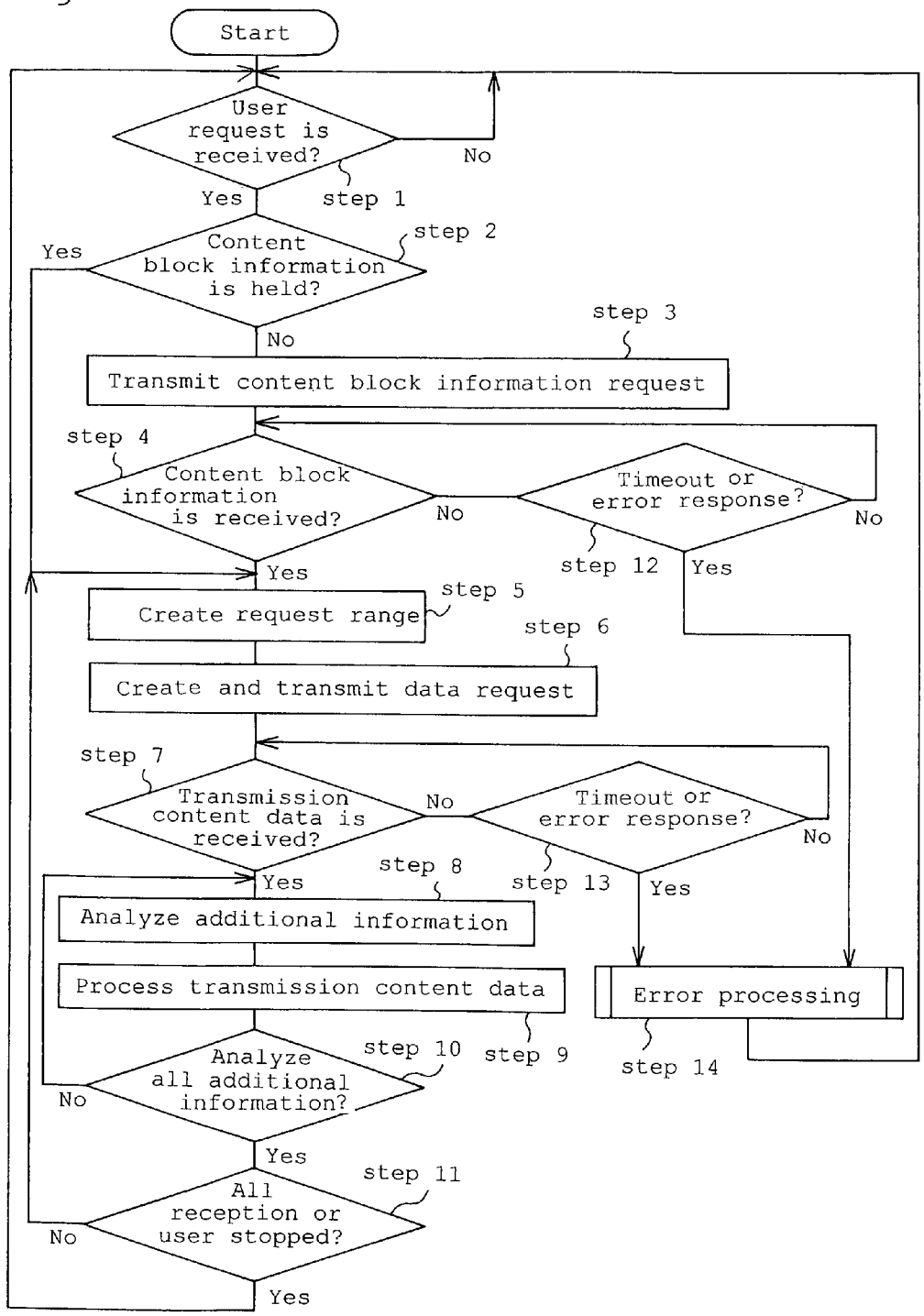
FIG. 10 is a flowchart diagram showing the behavior of the content receiver in the first embodiment of the present invention.

FIG. 10 is a flowchart showing the behavior of the content receiver 2 of the present embodiment. By using FIG. 10, the behavior of the content receiver 2 in the sequence described with reference to FIGS. 1(*a*) to 1(*g*) will be described below, and at the same time, through this description, one embodiment of the content delivery method of the present invention will be described.

When the user inputting means 201 receives a reception start request of the content stored in the content server 1 (step 1), the user inputting means 201 notifies the request range determining means 202 and the content block information acquiring means 207 of the content identifier to be requested (hoge.exe in the example of FIG. 1). At this time, when the range of the content desired to be received is also inputted to the user inputting means 201, that range is also notified to the request range determining means 202.

The content block information acquiring means 207 determines whether or not the content block information of the content corresponding to the notified content identifier is held (step 2), and if not held, transmits a content block information request (step 3). When the receiving means 204 receives the content block information (step 4), the receiving means 204 sends the received content block information to the content block information acquiring means 207. When the content block information acquiring means 207 receives the content block information, the content block information acquiring means 207 holds the content block information by associating it with the corresponding content identifier, and notifies the request range determining means 202 to that effect.

The request range determining means 202 determines the range of the content to be requested based on the range of the data desired to be received which has been inputted to the user inputting means 201 by the user and the available capacity of the receiving buffer 205. Further, the request range determining means 202 determines a request range corresponding to the range of the content to be requested under condition that the additional information is attached to each content block, and that one content block is attached with one piece only of the additional information (step 5). The additional information are retrieved from the content block information acquiring means 227. The request range determining means 202 notifies the data request transmitting means 203 of the determined request range together with the content identifier. The data request transmitting means 203 generates a data request (the message 1 of FIG. 1(*b*) and the message 3 of FIG. 1(*d*)) including the notified content identifier and the request range, and transmits it (step 6).

When the receiving means 204 receives the transmission content data (the message 2 of FIG. 1(*f*) and the message 4 of FIG. 1(*g*)) with the additional information corresponding to the transmitted data request (step 7), the receiving means 204 analyzes the additional information (step 8). In case the additional information consists of only the information regarding a level of importance, since the content receiver 2 has no need to do any particular processing regarding the additional information, the receiving means 204 removes the additional information and transmits the content data to the receiving buffer 205. This content data is sent to the content processing means 206 and is processed (step 9).

When the receiving means 204 does not finish yet analyzing the whole additional information (that is, there are content data not transmitted yet to the content processing means 206) (step 10), the procedure repeats the steps after step 8.

When all the contents (the range of the content is also included when it is inputted) corresponding to the content identifier inputted to the user inputting means 201 are received or the user instructs the user inputting means 201 to stop (step 11), the procedure returns to the start.

At step 2, when the content block information corresponding to these contents is already held in the content block acquiring means 207 by the previous communication and the like, the exchange of the content block information is not performed, and the procedure advances to step 5. However, in this case, the exchange of the content block information may be performed.

At step 4 or 7, when time is out before the content data is not yet received or an error response is received from the content server 1 (steps 12 and 13), an error processing is performed (step 14), and the procedure returns to the start.

The content called as the "program hoge.exe" took up in the present embodiment is just an example, and other contents such as an AV content including an image, video and an audio, and other formats will do as well.

In the present embodiment, while the content receiver 2 acquires the content block information from the content server 1 through the network 3, this is not necessarily applicable in the case where the configuration of the content blocks configuring the content is known in advance, in such a case that every content blocks have the same fixed length and the like. That is, the content block acquiring means 207 of the content receiver 2 may acquire the content block information stored in advance in a memory and the like by having access to its own memory or an external memory.

Further, in the present embodiment, for example, there may exist an intermediate device between the content server and the content receiver, and a data request may be transmitted from the content receiver to the intermediate device, and the intermediate device may access to the content server to acquire content, thereby transmitting the content to the content receiver. That is, the content server and the content receiver are not necessarily required to directly send and receive data on the network.

Further, the processing in the present embodiment may be realized by software. This software may be distributed by software downloading and the like. Further, this software may be stored in a storage medium such as CD-ROM and the like and disseminated. This holds true with another embodiment in the present description.

Further, the content data acquiring means 103 of the present embodiment is an example of the specifying means of the present invention, and the transmission content data constructing means 104 and the transmitting means 105 of the present embodiment are examples of the transmitting means of the present invention, and the receiving means 204 of the present embodiment is an example of the receiving means of the present invention, and the request range determining means 202 of the present embodiment is an example of the request range determining means of the present invention, and the data request transmitting means 203 of the present embodiment is an example of the requesting means of the present invention.

Second Embodiment

A second embodiment of the present invention will be described below with reference to the drawings. The same component elements as those of the first embodiment will be attached with the same reference numerals, and the description thereof will be omitted.

Figure 11:
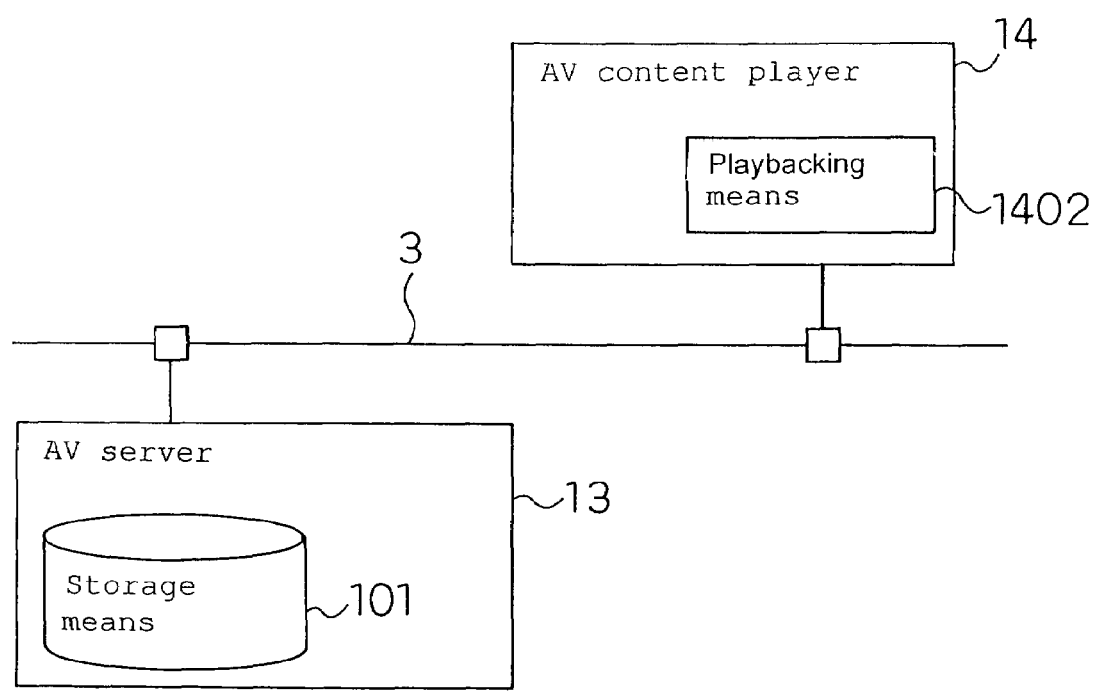
FIG. 11 is a view showing the configuration of a network adapted for a second embodiment of the present invention.

FIG. 11 is a block diagram of a network adapted to the present embodiment. An AV server 13 transmits an AV content including an image, video or an audio or mixture of them which are stored in storage means 101 to a network 3 according to a playbacking request from an AV content player 14.

An AV content player 14 receives the AV content from the AV server 13, and playbacks it by playbacking means 1402. As an example of the AV content, an MPEG video, an AC3 audio, a JPEG still image and the like can be cited.

FIG. 12(a) is a sequence view describing a transmission between the AV server 13 and the AV content player 14. In the present embodiment, HTTP is used for this transmission. However, in the present invention, no objection is raised on HTTP protocol. FIG. 12(a) is an example, where the AV content player 14 playbacks a video file hogehoge.mpg, which is one example of the AV content stored in the storage means 101 of the AV server 13, from the beginning of the content. Here, the hogehoge.mpg is a video file complying with MPEG format.

Figures 15, 16:
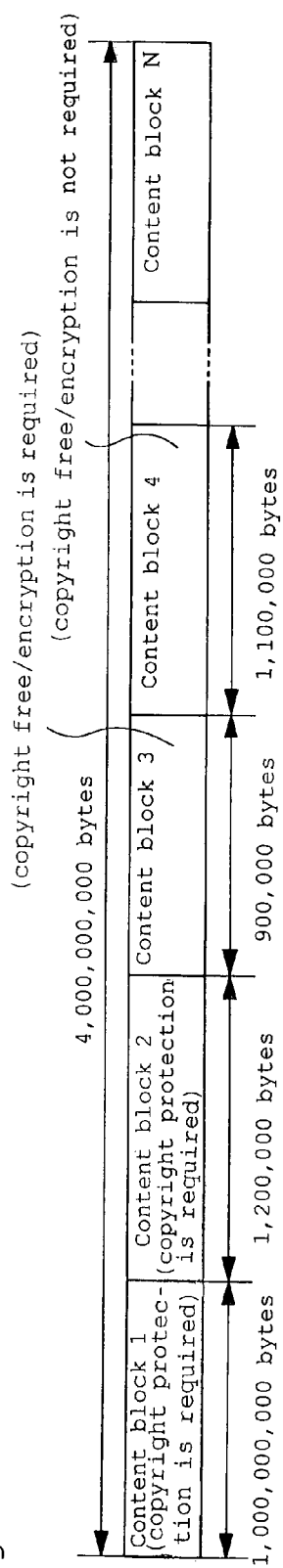
FIG. 15 is a view showing the configuration of a video file hogehoge.mpg cited as an example of the AV content in FIG. 12 in the second embodiment of the present invention.
FIG. 16 is a view showing an attribute table corresponding to a video file hogehoge.mpg cited as an example of the AV content in FIG. 12 in the second embodiment of the present invention.

In FIG. 15 is illustrated a configuration of the hogehoge.mpg. The hogehoge.mpg has a total size of 4,000,000,000 bytes, and a state of its copyright protection is different portion by portion in the content. This state of the copyright protection as an attribute does not change within one content block. That is, the content is divided into a plurality of content blocks so that the attribute of the content does not change within one content block. The first content block configuring the hogehoge.mpg has 1,000,000 bytes, the second content block 1,200,000 bytes, the third content block 900,000 bytes, and the fourth content block 1,100,000 bytes. Information on the copyright protection as the attribute is one example. It may be another attribute. Further, it may be the AV content in which the whole AV content is configured by one attribute. Further, no objection is raised on the total size and block size. The storage means 101 is preferably a non-volatile storage medium such as a hard disc, but may be realized even by a volatile storage medium.

As shown in FIG. 12(a), the AV server 13 and the AV content player 14 first exchange content block information regarding the AV content desired to be transferred. The AV content block information is a table showing how the content blocks are divided within the content.

In FIG. 16 is shown an example of the content block information. An offset shows a byte length from the beginning of the content. From this table, it is clear that a content block 1 starts from the 0th byte to the 999,999th byte, a content block 2 from the 1,000,000th byte to the 2,199,999th byte, a content block 3 from the 2,200,000th byte to the 3,099,999th byte, and a content block 4 from the 3,100,000th byte to the 4,199,999th byte. For the exchange of the content block information, HTTP may be used or another communication protocol may be used. In the present embodiment, the content block 1 and the content block 2 (from the 0th byte to the 2,199,999th byte) require the copyright protection, the content block 3 (from the 2,200,000th byte to the 3,099,999th byte) is free of the copyright, but requires an encryption, and the content block 4 (from the 3,100,000th byte to the 4,199,999th byte) is free of the copyright nor requires the encryption.

In FIG. 12(a), upon acquiring the content block information, the AV content player 14 transmits a message 1 which is a playbacking request toward the AV server 13 on condition that additional information is added to the heads of all the content blocks. As shown in FIG. 12(b), the message 1 includes a Range header as a request range, and requests for the transmission from the 0th byte to the 2,200,039th byte. Further, this takes into consideration, as shown in FIG. 12(f) the fact that, in a message 2 intended to be transmitted according to the request, there are the content block 1 and the content block 2, and moreover, 20 byte of additional information is added to each of these content blocks. This additional information is information showing a state of the copyright protection as the attribute.

Upon receiving the message 1, the AV server 13 transmits the message 2. The message 2, as shown in FIG. 12(c), includes a Content-Range header, and shows that the transmission of the 0th byte to the 2,200,039th byte is performed. Here, the range of transmission of the content excluding the additional information is from the 0th byte to the 2,199,999th byte. By adding two additional information to this range, the transmission becomes from 0th byte to the 2,200,039th byte. The AV content player 14, after executing a predetermined processing to message 2, retrieves a portion excluding the additional information (equivalent to the 0th byte to the 2,199,999th byte), and performs the processing of the content. The additional information used in the present embodiment is 20 bytes.

The same thing holds true with the message 3 and the message 4 (shown by FIGS. 12(d), 12(e) or 12(g), respectively). Subsequently, the above described procedure is repeated until the end of content is transmitted or a network playbacking is stopped by the user of the AV content player 14.

That is, the AV content is divided into a plurality of content blocks so that the attribute of the content does not change within one content block. The AV server 13, when sending the portion of the content requested by the AV content player 14 to the AV content player 14, attaches the additional information according to the attribute of the content to every content block, and transmits the content. Consequently, the AV content player 14 can designate a range desired to be received when receiving the AV content with the additional information from the AV server 13 based on the content block information on condition that the additional information is attached to every content and transmitted. Thus, as shown in the message 2 of FIG. 12(f), even in the case where the content block 1 and the content block 2 are transmitted by one HTTP message and also in the case where the content block 1 and the content block 2 are divided by two HTTP messages and transmitted, the additional information is attached to the content block 1 by one piece only, and is attached also to the content block 2 by one piece only. In this way, regardless of how the HTTP message is prepared by the combination or division of the content block, since the additional information is always attached to every content block, the AV content player 14, when receiving the content with the additional information from the AV server 13, can designate a range desired to be received.

Further, the AV server 13, when preparing the HTTP message such as the message 2 and the like of FIG. 12, prepares the HTTP message in such a way that the additional information always comes right after the HTTP header so as to be illustrated in FIG. 12(f), so that it can easily cope with a situation in which a packet or a message is lost on the network. That is, the AV server 13 attaches the additional information to the head of the content block, and transmits the content block by allowing the HTTP message, that is, the data portion of the packet of the HTTP to start from the additional information, thereby it can easily cope with a situation in which the packet or the message transferred right before the content block is lost.

In case the size of the content block is a fixed length, the additional information is attached to the head of the content block, and one or more content blocks are stored in a message body portion of the HTTP message, so that the head of the message body of the HTTP message can easily be allowed to start from the additional information.

Figure 13:
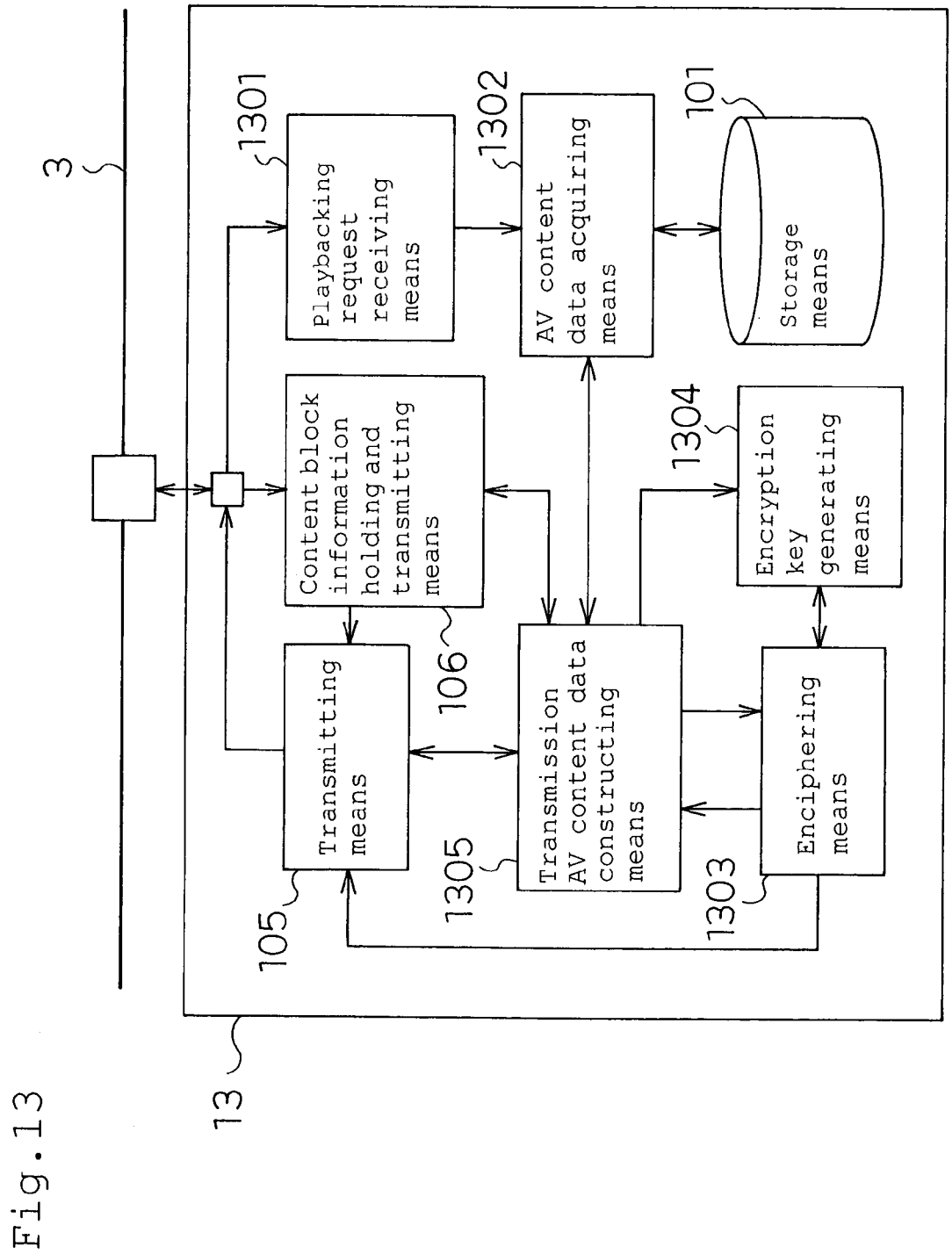
FIG. 13 is a block diagram showing the configuration of the AV server in a second embodiment of the present invention.

FIG. 13 is a block diagram showing a configuration of the AV server 13 of the present embodiment. In FIG. 13, the storage means 101 stores the AV content including one or more images, video or the audio or mixture of them. Playbacking request receiving means 1301 receives a playbacking request from the AV content player 14 through the network 3. The playbacking request comprises an AV content identifier, which is information for identifying the AV content, and a request range of the AV content identified by the AV content identifier. Here, the request range is a range calculated by including the additional information on assumption that the additional information is inserted for every content block.

AV content data acquiring means 1302 refers to the content block holding and transmitting means 106 in order to know which portion of the AV content is requested by the received request range after excluding the additional information, and determines which portion of the AV content from the received request range should be transmitted. The AV content data acquiring means 1302, when sending the retrieved AV content data to transmission AV content data constructing means 1305, sends the AV content blocks one by one. That is, the AV content data acquiring means 1302, after sending one content block to the transmission AV content data constructing means 1305, notifies the transmission AV content data constructing means 1305 of completion of sending of the content block.

The transmission AV content data constructing means 1305 attaches the additional information necessary for transmitting the AV content data to the AV content data of the range transmitted from the AV content data acquiring means 1302, and constructs the transmission AV content data.

Enciphering means 1303 enciphers the AV content data inputted from the transmission AV content data constructing means 1305 and transmits it to the transmitting means 105.

An encryption key is generated by encryption key generating means 1304. A method of notifying the information for decryption according to the procedure determined in advance between the AV server 13 and the AV content player 14 is decided, and the information for decryption according that method is included in the additional information generated by the transmission AV content data construction means 1305. The key itself is delivered to the enciphering means 1303, and is used for enciphering the AV content data. In the present embodiment, the key is changed for every content block. The key for encryption and the key for decryption may be the same key (common key) or may be different.

While the transmitting means 105 and the content block information holding and transmitting means 106 have the same functions as those described in the first embodiment, the content handled in the present embodiment is the AV content. Further, the substance of the additional information is a state of the copyright protection and the information for decryption.

Figure 17:
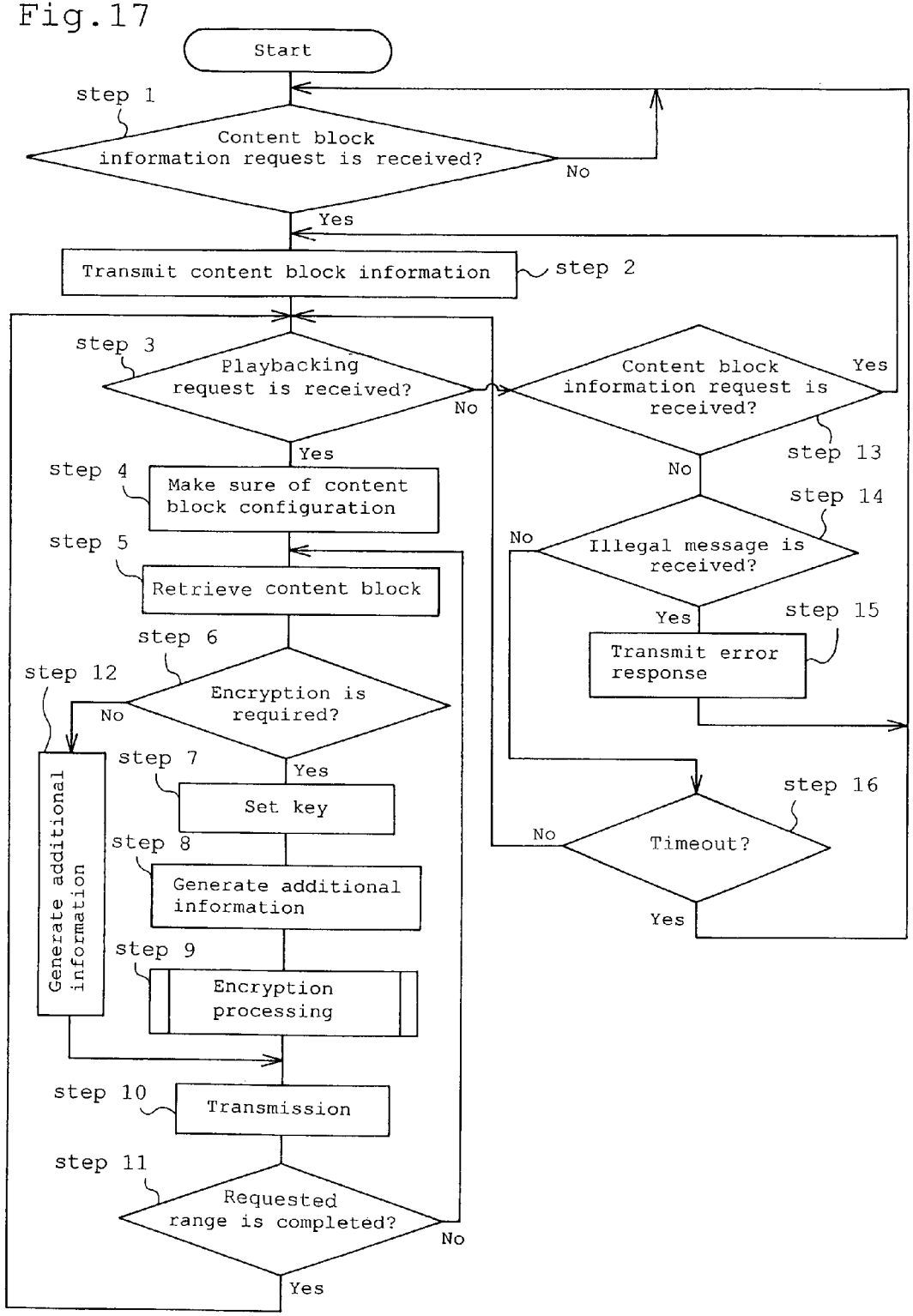
FIG. 17 is a flowchart showing the behavior of the AV server in the second embodiment of the present invention.

FIG. 17 is a flowchart showing the behavior of the AV server 13 of the present embodiment. Hereinafter, the behavior of the AV server 1 in the sequence described with reference to FIGS. 12(a) to 12(g) will be described by using FIG. 13, and at the same time, through this description, one embodiment of the content delivery method of the present invention will be described.

Upon receipt of a content block information request including the AV content identifier of the AV content desired to be acquired from the AV content player 14 by the AV server 1 (step 1), the content block information holding and transmitting means 106 transmits the content block information corresponding to the content to the AV content player 14 through the transmitting means 105 (step 2).

Subsequently, when play backing request receiving means 1301 receives the HTTP message which is a playbacking request (the message 1 of FIG. 12(b) and the message 3 of FIG. 12(d) including a GET method) (step 3), this HTTP message is sent to the AV content data acquiring means 1302.

The AV content data acquiring means 1302 extracts a URI (hogehoge.mpg in the present embodiment), which is the AV content identifier, from the received HTTP message, and extracts the request range from the Range header. The AV content data acquiring means 1302 first refers to the content block information holding and transmitting means 106, and makes sure of the content block information of the AV content shown by the AV content identifier (step 4). The AV content data acquiring means 1302 specifies a position of the actual content data from the received request range on condition that an additional information is attached to each content blocks of this AV content. Next, the AV content data acquiring means 1302 retrieves the first content block of the request range from the storage means 101 (step 5), and transmits it to the transmission AV content data constructing means 1305, and when the transmission of the first content block is completed, notifies the transmission AV content data constructing means 1305 to that effect.

The transmission AV content data constructing means 1305 determines whether or not the encryption is required for the content block transmitted from the AV content data acquiring means 1302 (step 6). In the present embodiment, the attribute (the copyright information in the present embodiment) of the content block is recorded in the head of each content block.

When the encryption is required, the transmission AV content data constructing means 1305 instructs an encryption key generating means 1304 to generate an encryption key and a setting of the encryption key to the enciphering means 1303. The encryption key generating means 1304 generates the key, and sets the key to the enciphering means 1303 (step 7) and, at the same time, notifies the transmission AV content data constructing means 1305 of the information for decryption.

The transmission AV content data constructing means 1305 refers to the content block information holding and transmitting means 106, and generates additional information including a state (copyright protection required in the case of the content block 1) of the copyright protection from the content block information and the information for decryption from the encryption key generating means 1304 (step 8). Further, the transmission AV content data constructing means 1305 transmits content data required for encryption to the enciphering means 1303, and the enciphering means 1303 executes an enciphering processing (step 9).

After that, the transmission AV content data constructing means 1305 first transmits the additional information to the transmitting means 105, and then, instructs the enciphering means 1303 to send the encrypted AV content data to the transmitting means 105.

The transmitting means 104 first transmits the HTTP header in conformity to HTTP, and then, transmits the additional information. After that, the transmitting means 104 transmits the encrypted data of the AV content (step 10). The transmitting means 104, when completing the transmission, notifies the transmission AV content data constructing means 1305 to that effect, and the transmission AV content data constructing means 1305 notifies the AV content data acquiring means 1302 of the completion of the transmission. The AV content data acquiring means 1302, when there is a content block corresponding to the request range which is not yet transmitted, transmits the next content block to the transmission AV content data constructing means 1305, and notifies the constructing means 1305 to that effect when the transmission is completed.

At step 6, upon determining that there is no need to encrypt the data of the AV content to be transmitted from now, the transmission AV content data constructing means 1305 generates the additional information including the information regarding the decryption showing that the data is in, such as copy free and encryption needless state, and is not enciphered (step 12). The transmission AV content data constructing means 1305 sends the transmission AV content data constructed in such way to the transmitting means 105, and the transmitting means 105 transmits the transmission AV content data including the additional information in conformity to HTTP (step 10).

The transmission AV content data constructing means 1305 determines whether or not the request range requested reaches to the end (step 11), and when not yet reached, the processing after step 5 is performed regarding the AV content data of the range not yet transmitted.

At step 11, when the request range reaches to the end, the procedure returns to step 3, and awaits the next play backing request.

At step 3, when the content receiver 2 receives a new content block information request during the play backing request is not being received (step 13), the procedure returns to step 2 and transmits the corresponding content block information. When an illegal message is received (step 14) an error response is transmitted (step 15), and the procedure returns to step 1. When a predetermined time passes and time is out before neither of the playbacking request nor the content block information request is received (step 16), the procedure returns to step 1.

Figure 14:
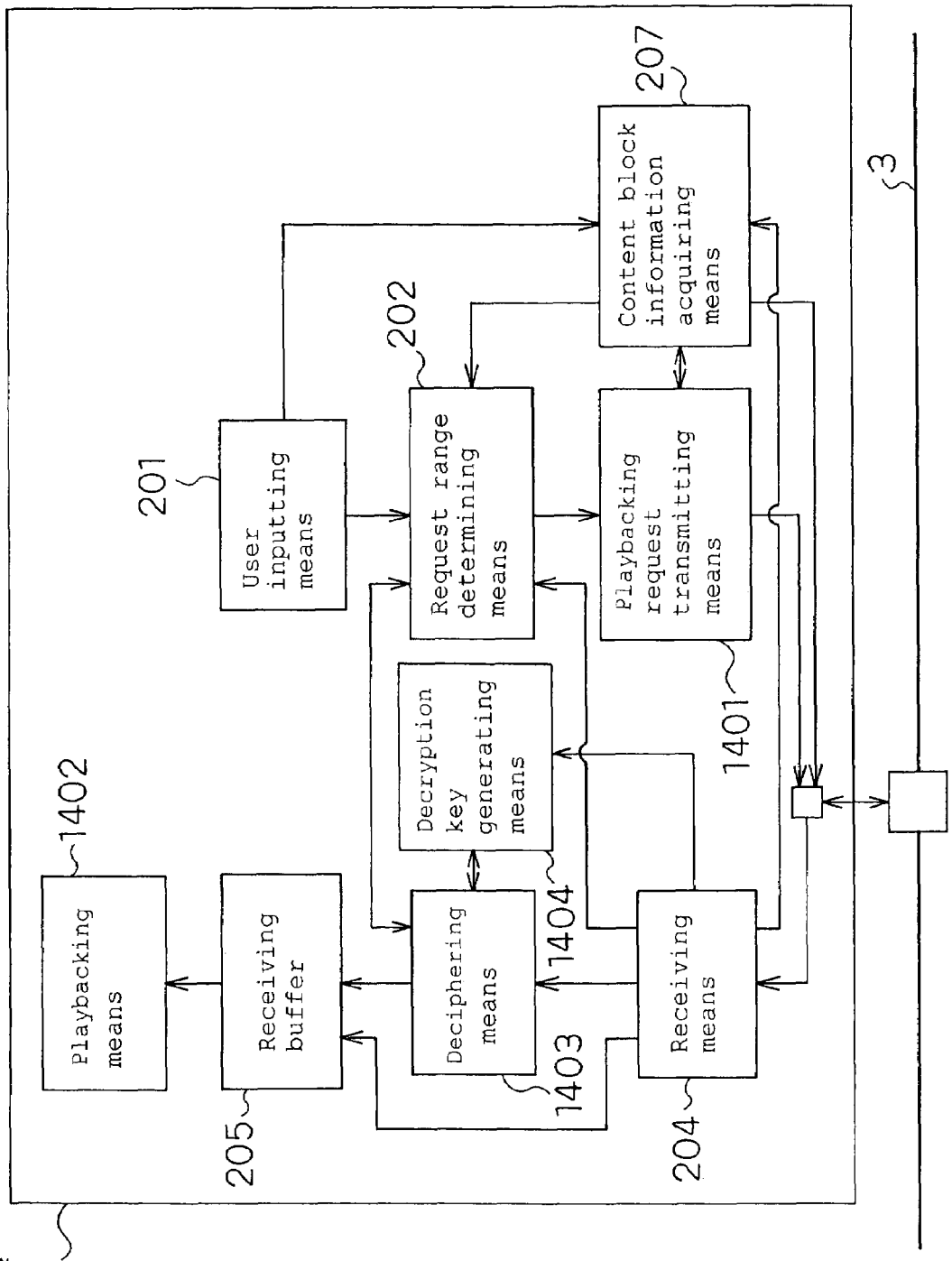
FIG. 14 is a block diagram showing the configuration of the AV content player in the second embodiment of the present invention.

FIG. 14 is a block diagram showing the configuration of the AV content player 14 of the present embodiment. In FIG. 14, user inputting means 201 receives from the user an AV content identifier (such as a name) of an AV content which is identifies an AV content to be played. To be more specific, the user inputting means 201 receives the AV content identifier and information on the time desired to be played (resume after 30 minutes and the like). The user inputting means 201 may receive only the AV content identifier. The input means of the information received by the user inputting means 201 may be anything such as operating a menu screen by using a ten key, a key board, a mouse, and a remote controller. The user inputting means 201 can be realized by a device driver of the input means such as the ten key, the key board and the like and by control software of the menu screen and the like.

Request range determining means 202 determines a request range upon receipt of the notification from the user inputting means 201, an enquiry result regarding the available capacity of the receiving buffer 205, the notification from receiving means 204, and the other information or notification. The request range is determined as the range in which the additional information corresponding to the range of the data to be acquired is included on condition that a range of the data to be acquired is determined based on the information received by the user inputting means 201, the enquiry result regarding the available capacity of the receiving buffer 205, the notification from the receiving means 204 and the like, and that the additional information is attached to the heads of all the content blocks configuring the AV content by referring to the content block information acquired by the content block information acquiring means 207.

Playbacking request transmitting means 1401 generates a playbacking request including the AV content identifier and the request range which request for reception, and transmits it to the network 3.

The receiving means 204 receives the transmission AV content data from the network 3, and transmits the transmission AV content data to the receiving buffer 205 and, at the same time, notifies the request range determining means 202 a length of the received transmission AV content data or the end position of the received data. Further, the receiving means 204 determines from the additional information whether or not the transmission AV content data is enciphered, and when determined that it is enciphered, notifies a deciphering key generating means 1404 of the information regarding the decryption.

The playbacking means 1402 receives the AV content data in order from the receiving buffer 205 and executes playbacking. The playbacking means 1402 may be considered as including or not including an output device such as display, a speaker and the like. The playbacking means 1402 can be realized by the driver software and the playbacking software of the output device or by the output device, the driver software of the output device and the playbacking software and the like.

The deciphering means 1403 receives the enciphered AV content data from the receiving means, and decrypts and transmits them to the playbacking means 1402. A decryption key is generated by the decryption key generating means 1404 based on the information for decryption from receiving means 204, and is set to the deciphering means 1403.

The decryption key generating means 1404 generates a key by a predetermined method from the information for decryption notified from the receiving means 205, and sets it to the deciphering means 1403. As the method of generating a key, there is, for example, the following method. A key (key encryption key) for enciphering and deciphering a key is shared commonly in advance between the AV server 13 and the AV content player 14, and a key for deciphering which is enciphered by the key encryption key is included in the additional information as the information for decryption. The decryption key generating means 1404 calculates a key for decryption by the commonly shared key encryption key.

The content block information acquiring means 207 transmits the content block information request which requests for the content block information, and receives as its response the content block information from the AV server 13 through the receiving means 204, and holds it.

Figure 18:
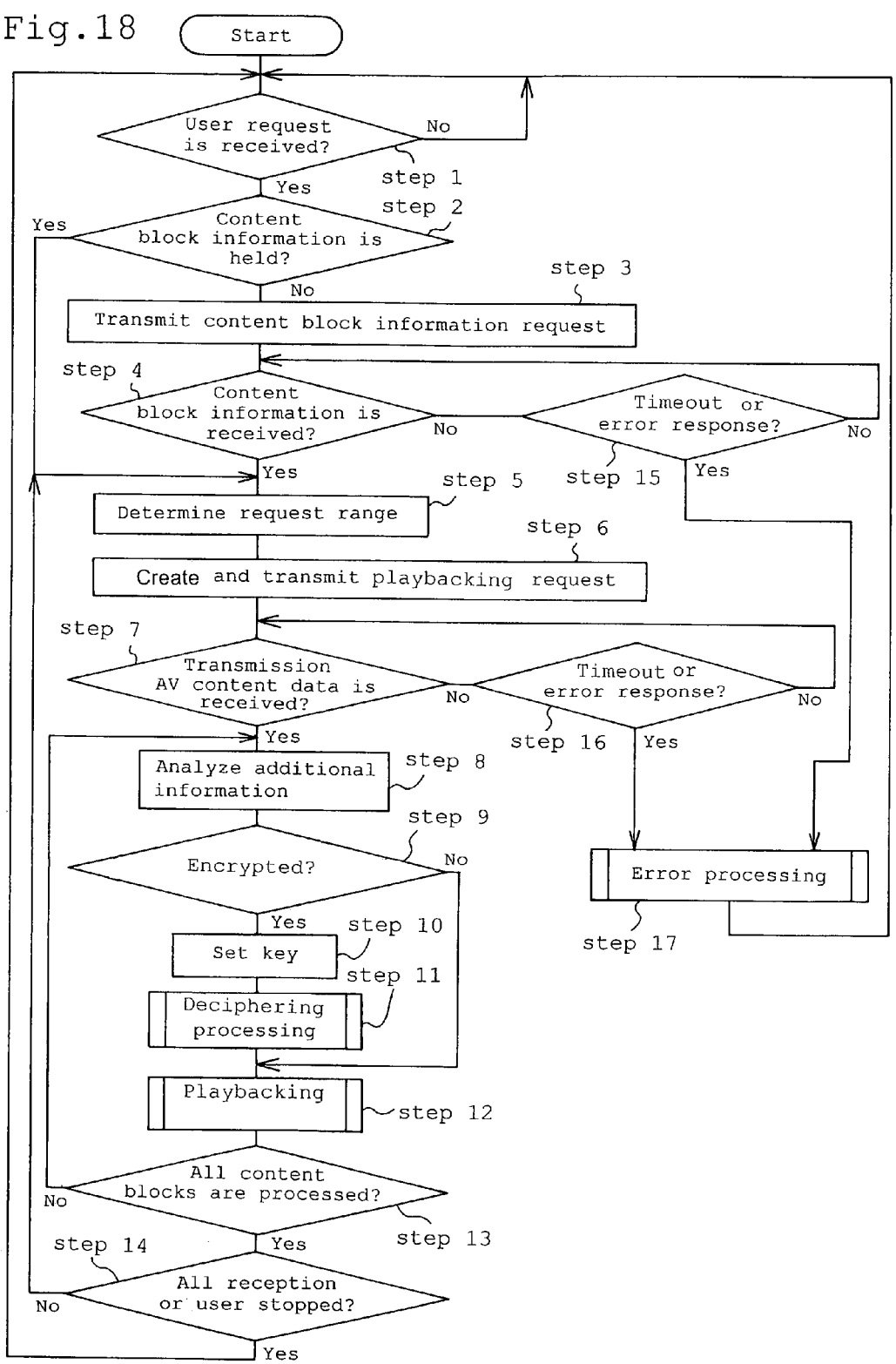
FIG. 18 is a flowchart diagram showing the behavior of the AV content player in the second embodiment of the present invention.

FIG. 18 is a flowchart showing the behavior of the AV content player 14 of the present embodiment. Hereinafter, the behavior of the AV content player 14 in the sequence described with reference to FIGS. 12(a) to 12(g) will be described by using FIG. 18, and at the same time, through this description, one embodiment of the content delivery method of the present invention will be described.

When the user inputting means 201 receives a network playbacking request of the AV content stored in the AV server 13 (step 1), the user inputting means 201 notifies the request range determining means 202 and the content block information acquiring means 207 of the AV content identifier to be requested (hogehoge.mpg in the example of FIG. 12). At this time, when the range of the content desired to be received is also inputted to the user inputting means 201, that range is also notified to the request range determining means 202.

The content block information acquiring means 207 determines whether or not the content block information of the AV content corresponding to the notified AV content identifier is held (step 2), and if not held, transmits a content block information request (step 3). When the receiving means 204 receives the content block information (step 4), the receiving means 204 sends the received content block information to the content block information acquiring means 207. When the content block information acquiring means 207 receives the content block information, the content block information acquiring means 207 holds the content block information by associating it with the corresponding content identifier, and notifies the request range determining means 202 to that effect.

The request range determining means 202 determines the range of the AV content to be requested based on the range of the data desired to be received which has been inputted to the user inputting means 201 by the user and the available capacity of the receiving buffer 205. Further, the request range determining means 202 determines a request range corresponding to the range of the AV content to be requested under condition that the additional information is attached to each content block and that one content block is attached with only one piece of the additional information (step 5). The additional information are retrieved from the content block information acquiring means 207. The request range determining means 202 notifies the playbacking request transmitting means 1401 of the request range determined together with the content identifier. The playbacking request transmitting means 1401 generates a playbacking request (the message 1 of FIG. 12(b) and the message 3 of FIG. 12(d)) including the notified content identifier and request range, and transmits the request (step 6).

When the receiving means 204 receives the transmission AV content data (the message 2 of FIG. 12(f) and the message 4 of FIG. 12(g)) with the additional information corresponding to the transmitted playbacking request (step 7), the receiving means 204 first analyzes the additional information (step 8) and makes sure of a state of the copyright protection, and determines whether or not the received AV content data is enciphered (step 9). When enciphered, the receiving means 204 notifies the decryption key generating means 1404 of the information for decryption including in the additional information.

The decryption key generating means 1404 generates a key from the notified information for decryption, and sets it to the deciphering means 1403 (step 10). After that, the decryption key generating means 1404 notifies the receiving means 204 that a setting of key is completed.

Upon receipt of the notice that a setting of key is completed from the decryption key generating means 1404, the receiving means 204 transmits the content block included in the received transmission AV content data to the deciphering means 1403. At this time, when the transmission AV content data received at step 7 includes a plurality of content block (consequently, includes a plurality of additional information), the receiving means 204 transmits the first content block not yet sent to the deciphering means 1403 to the deciphering means 1403.

The deciphering means 1403 deciphers the data of the transmitted content block by using the key set by the decryption key generating means 1404 (step 11), and sends it to the playbacking means 1402. The playbacking means 1402 plays the content block portion of the AV content by the output device and the like (step 12).

When it is determined that the AV content data is not enciphered at step 9, each content block configuring the received transmission AV content data is transmitted directly to the playbacking means 1402 in order, and playbacking is executed (step 12).

When the receiving means 204 does not perform yet the processing of all the content blocks forming the received transmission AV content data (that is, the data of all the content block is not yet transmitted to the playbacking means 1402)(step 13), the procedure after step 8 is repeated.

When the whole of the AV content corresponding to the AV content identifier inputted to the user inputting means 201 (the range in case it is also inputted) is received or the user instructs to stop by using the user inputting means 201 (step 14), the procedures returns to the start. Otherwise, the procedure after step 5 is repeated.

At step 2, when the content block information corresponding to the AV contents is already held in the content block acquiring means 207 by the previous communication and the like, the exchange of the content block information is not performed, and the procedure advances to step 5. However, in this case, the exchange of the content block information may be performed.

At step 4 or 7, when time is out before the content data is not yet received or an error response is received from the AV server 13 (steps 15 and 16), an error processing is performed (step 17), and the procedure returns to the start.

The AV content called as the "video file hogehoge.mpg" took up in the present embodiment is an example, and other AV contents, for example, the contents comprising a JPEG still image, an AC3 audio, and other formats will do as well.

When the AV content is a video of DVD-VR format, VOBU (Video OBject Unit) can be taken as content block. In this case, it is ensured that a video of DVD-VR format is recorded such that the attribute (the attribute regarding the copyright protection in the present embodiment) is not changed within each VOBU.

Further, when the AV content is a MPEG video, GOP can be taken as content block. In this case also, it is ensured an MPEG video is recorded such that the attribute (the attribute regarding the copyright protection in the present embodiment) is not changed within each GOP.

Further, in the present embodiment, while the AV content player 14 acquires the content block information from the AV server 13 through the network 3, this is not necessarily application, for example, in case the configuration of the content block configuring the content by the AV content player 14 is known in advance by making a content block length into a fixed length and the like. That is, the content block acquiring means 207 of the AV content player 14 may acquire the content block information stored in advance in a memory and the like by having access to its own memory or an external memory.

Further, in the present embodiment, for example, there exists an intermediate device between the AV server and the AV content player, and a playbacking starting request may be transmitted from the AV content player to the intermediate device, and the intermediate device may access to the AV server to acquire an AV content, thereby transmitting the AV content to the AV content player. That is, the AV server and the AV content player are not necessarily required to directly send and receive data on the network.

Further, the AV server of the present embodiment is an example of the content server of the present invention, and the AV content data acquiring means 1302 of the present embodiment is an example of the specifying means of the present invention, and the transmission AV content data constructing means 1305 and the transmitting means 105 of the present embodiment are examples of the transmitting means of the present invention, and the AV content player 14 of the present embodiment is an example of the content receiver of the present invention, and the receiving means 204 of the present embodiment is an example of the receiving means of the present invention, and the request range determining means 202 of the present embodiment is an example of the request range determining means of the present invention, and the playbacking request transmitting means 1401 of the present embodiment is an example of the requesting means of the present invention.

Further, the processing in the present embodiment may be realized by software. This software may be distributed by software downloading and the like. Further, this software may be stored in a storage medium such as CD-ROM and the like and disseminated. This holds true with another embodiment in the present description.

By including the user information on the content data or the AV content data in the additional information, these data can be used even under the application of access control. Further, the use of these data can be extended to the standard or non-standard protocol other than HTTP.

Further, the AV content player of the present embodiment can designate the range of the requested AV content even when it does not know where the attribute of the AV content changes. The AV server of the present embodiment has no need to make sure of all the attributes of the AV content before transmitting the AV content, and therefore, the processing load of the AV server is reduced.

The program of the present invention is a program for executing a function of the means or the device of the all or the part of the content delivery system of the present invention by a computer, and is a program operating in collaboration with the computer.

Further, the program of the present invention is a program for executing a function of the means of the all or the part of the content server of the present invention by a computer, and is a program operating in collaboration with the computer.

Further, the program of the present invention is a program for executing a function of the means of the all or the part of the content receiver of the present invention by a computer, and is a program operating in collaboration with the computer.

Further, the storage medium of the present invention is a storage medium storing a program for executing the means or a function of the device of the all or the part of the content delivery system of the present invention by a computer, and is a storage medium for executing the above described function by the program readable and read by the computer in collaboration with the computer.

Further, the storage medium of the present invention is a storage medium storing a program for executing the function of the all or the part of the means of the all or the part of the content server of the present invention by a computer, and is a storage medium for executing the above described function by the program readable and read by the computer in collaboration with the computer.

Further, the storage medium of the present invention is a storage medium storing a program for executing the function of the all or the part of the means of the all or the part of the content receiver of the present invention by a computer, and is a storage medium for executing the above described function by the program readable and read by the computer in collaboration with the computer.

What is meant by the part of the above described "means" or "device" is one or several means from among a plurality of those means.

Further, what is meant by the above described "function of means (or means or device)" is all or a part of functions of the means.

Further, one use case of the program of the present invention may be a case recordable in the storage medium readable by the computer and operable in collaboration with the computer.

Further, one use case of the program of the present invention may be a case transmittable in a transmission medium and readable by the computer and operable in collaboration with the computer.

Further, as the storage medium, ROM and the like are included, and as the transmission medium, a transmission medium such as an Internet and the like, light, radio wave, sound wave, and the like are included.

Further, the above described computer of the present invention is not limited to pure hardware such as CPU and the like, but may be firmware and OS, and moreover, may include peripheral equipment.

As described above, the configuration of the present invention may be realized in software wise or may be realized in hardware wise.

The content delivery system, the content server, the content receiver, the content delivery method, the storage medium, and the program according to the present invention have effectiveness capable of designating a range desired to be received when receiving the content with the additional information from the content server, and are useful for the content delivery system, the content server, the content receiver, the content delivery method, the storage medium, the program and the like, for delivering a content to which the additional information is attached based on the attribute of the content.

What is claimed is:

1. A content delivery system for transmitting a content which is divided into a plurality of content blocks, comprising:

a content server including a memory and having a specifying unit of specifying one or more content blocks associated with ranges, and a transmitting unit of transmitting said one or more specified content blocks according to a predetermined communication protocol, wherein each respective content block of the plurality of content blocks has additional attached information, the additional attached information of the respective content indicating an attribute related to the content within the respective content block, the attribute of the respective content block being common to a respective range of content blocks; and a content receiver having a receiving unit of receiving said content, a request range determining unit of determining a request range of said content based on the additional attached information of each content block by utilizing content block information indicating at least a length for each of said content blocks and the common attribute, and a requesting unit of requesting said content associated with the determined request range from content associated with the ranges.

2. A content server for transmitting a content which is divided into a plurality of content blocks, comprising:
a memory for storing the content, as said content blocks;
a specifying unit of retrieving the content blocks associated with the content from the memory and specifying one or more content blocks associated with ranges, and a transmitting unit of transmitting said one or more specified content blocks according to a predetermined communication protocol, wherein each respective content block of the plurality of content blocks has additional attached information, the additional attached information of the respective content indicating an attribute related to the content within the respective content block, the attribute of the respective content block being common to a respective range of content blocks; and
wherein said specifying unit specifies said one or more content blocks associated with ranges by a requesting unit of the content receiver, and said requesting unit comprises:
a receiving unit of receiving said content from said transmitting unit,
a request range determining unit of determining a request range of said content based on the additional attached information of each content block by utilizing content block information indicating at least a length for each of said content blocks and the common attribute; and
wherein said requesting unit requests for said content associated with the determined request range from content associated with the ranges.

3. The content server according to claim 2, wherein said predetermined communication protocol is an HTTP (Hypertext Transfer Protocol).

4. The content server according to claim 3, wherein said additional attached information is attached to a head of at least one of said content blocks, and said transmitting means transmits said one or more specified content blocks such that a data portion of an HTTP message starts from the additional attached information.

5. The content server according to claim 2, wherein each of said content blocks has a fixed length.

6. The content server according to claim 2, wherein said transmitting unit transmits said content block information, and said requesting unit uses the transmitted content block information.

7. The content server according to claim 2, wherein said content is an AV content including image, video and/or audio.

8. The content server according to claim 2, wherein said additional attached information includes information showing a state of copyright protection of said content.

9. The content server according to claim 2, wherein, when said transmitted content is enciphered, said additional attached information includes information for deciphering said transmitted content.

10. The content server according to claim 7, wherein said AV content is a video of a MPEG format, and said content block is a GOP (Group of Picture).

11. The content server according to claim 7, wherein said AV content is video of DVD-VR format, and said content block is a VOBU (Video Object Unit).

12. A content receiver for transmitting a content which is divided into a plurality of content blocks, comprising:
a receiving unit of receiving said content transmitted from a transmitting unit of a content server having a specifying unit of specifying one or more content blocks associated with ranges and a transmitting unit of transmitting said one or more specified content blocks according to a predetermined communication protocol, wherein each respective content block of the plurality of content blocks has additional attached information indicating an attribute related to the content within the respective content block, the attribute of the respective content block being common to a respective range of content blocks;
a memory which includes a receiving buffer that receives said content from said receiving unit;
a request range determining unit receiving the content stored in the receiving buffer and, determining a request range of said content based on the attached additional information of each content block by utilizing content block information indicating at least a length for each of said content blocks and the common attribute; and
a requesting unit of requesting said content associated with the determined one or more request ranges from content associated with the ranges,
wherein said specifying unit specifies said one or more content blocks of said ranges requested by said requesting unit.

13. The content receiver according to claim 12, wherein said predetermined communication protocol is an HTTP (Hypertext Transfer Protocol).

14. The content receiver according to claim 13, wherein said additional attached information is attached to a head of at least one of said content blocks, and said transmitting unit transmits said one or more specified content blocks such that a data portion of an HTTP message starts from the additional attached information.

15. The content receiver according to claim 12, wherein each of said content blocks has a fixed length.

16. The content receiver according to claim 12, wherein said transmitting unit transmits said content block information, and said requesting unit uses the transmitted content block information.

17. The content receiver according to claim 12, wherein said content is an AV content including image, video and/or audio.

18. The content receiver according to claim 12, wherein said additional attached information includes information showing a state of copyright protection of said content.

19. The content receiver according to claim 12, wherein, when said transmitted content is enciphered, said additional attached information includes information for deciphering said transmitted content.

20. The content receiver according to claim 17, wherein said AV content is video of a MPEG format, and said content block is a GOP (Group of Picture).

21. The content receiver according to claim 17, wherein said AV content is video of a DVD-VR format, and said content block is a VOBU.

22. A content delivery method used with a content delivery system including a content server and a content receiver, the content delivery system transmitting a content which is divided into a plurality of content blocks, the method comprising the steps of:
a specifying step, performed by said content server, for specifying one or more content blocks associated with ranges;
an attaching step for attaching additional information of the respective content indicating an attribute related to the content within the respective content block, the attribute of the respective content block being common to a respective range of content blocks;

a transmitting step, performed by said content server, for transmitting said one or more specified content blocks according to a predetermined communication protocol;

a receiving step, performed by said content receiver, for receiving said content and storing the content in a memory which includes a receiving buffer;

a request range determining step, performed by said content receiver, for determining a request range of said content based on the additional attached information of each content block by utilizing content block information indicating at least a length for each of said content blocks and the common attribute; and a requesting step for requesting said content associated with the determined request range from content associated with the ranges.

23. A content delivery method for transmitting a content which is divided into a plurality of said content blocks, said content delivery method comprising:

a storing step for storing the content in a memory;

a specifying step for specifying one or more content blocks associated with ranges;

an attaching step for attaching additional information of the respective content indicating an attribute related to the content within the respective content block, the attribute of the respective content block being common to a respective range of content blocks; and a transmitting step for transmitting said one or more specified content blocks according to a predetermined communication protocol, wherein said specifying step specifies said one or more content blocks associated with said ranges requested by a requesting unit of the content receiver and includes receiving said content; determining a request range of said content based on the additional attached information of each content block by utilizing content block information indicating at least a length for each of said content blocks and the common attribute; and requesting said content associated with the determined request range from content associated with the ranges.

24. A content delivery method for receiving a content which is divided into a plurality of content blocks, said content delivery method comprising:

a receiving step for receiving said content and holding the content in a memory, the content transmitted from a transmitting unit of a content server having a specifying unit of specifying one or more content blocks associated with ranges and said transmitting unit transmitting said one or more specified content blocks according to a predetermined communication protocol by attaching additional information of the respective content indicating an attribute related to the content within the respective content block, the attribute of the respective content block being common to a respective range of content blocks;

a transmitting step for transmitting said one or more specified content blocks according to the predetermined communication protocol;

a request range determining step for determining a request range of said content based on the additional attached information of each content block by utilizing content block information indicating at least a length for each of said content blocks and the common attribute; and a requesting step for requesting said content of the determined request range from content associated with the ranges, wherein said specifying unit specifies said one or more content blocks associated with the ranges requested by said requesting step.

25. A computer readable medium storing program code for execution by a processor to implement the steps comprising:

specifying one or more content blocks associated with ranges;

transmitting said one or more specified content blocks according to a predetermined communication protocol, each respective content block of a plurality of content blocks having additional attached information, the additional attached information of the respective content indicating an attribute related to a content within the respective content block, the attribute of the respective content block being common to a respective range of content blocks;

receiving said content;

determining a request range of said content based on the additional attached information of each content block by utilizing content block information indicating at least a length for each of said content blocks and the common attribute; and requesting for said content associated with the determined request range from content associated with the ranges.

26. A computer readable medium storing program code for execution by a processor to implement the steps comprising:

storing, in a memory, content, as content blocks;

specifying, by a content server, one or more content block associated with ranges; and transmitting, by a content server, said one or more specified content blocks according to a predetermined communication protocol, each respective content block of the plurality of content blocks having additional attached information, the additional attached information of the respective content indicating an attribute related to the content within the respective content block, the attribute of the respective content block being common to a respective range of content blocks.

27. A computer readable medium storing program code for execution by a processor to implement the steps comprising:

receiving, by a receiving buffer, content having one or more content blocks associated with one or more ranges, wherein each respective content block of a plurality of content blocks has additional attached information indicating an attribute related to the content within the respective content block, the attribute of the respective content block being common to a respective range of content blocks;

determining, by the content receiver, a request range of said content based on the additional attached information of each content block by utilizing content block information indicating at least a length for each of said content blocks and the common attribute; and requesting said content associated with the determined request range from content associated with the ranges.

* * * * *

UNITED STATES PATENT AND TRADEMARK OFFICE
CERTIFICATE OF CORRECTION

PATENT NO. : 7,599,962 B2  Page 1 of 1
APPLICATION NO. : 10/987122
DATED : October 6, 2009
INVENTOR(S) : Tanabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 910 days.

Signed and Sealed this

Twenty-eighth Day of September, 2010

David J. Kappos
*Director of the United States Patent and Trademark Office*